(12) United States Patent
Mueck et al.

(10) Patent No.: US 8,537,863 B2
(45) Date of Patent: Sep. 17, 2013

(54) METHODS AND APPARATUS FOR RECEPTION OF DYNAMIC INFORMATION BY INACTIVE RECEIVERS

(75) Inventors: Markus Mueck, Unterhaching (DE); Andreas Schmidt, Braunschweig (DE)

(73) Assignee: Apple Inc., Cupertino, CA (US)

( * ) Notice: Subject to any disclaimer, the term of this patent is extended or adjusted under 35 U.S.C. 154(b) by 836 days.

(21) Appl. No.: 12/611,715

(22) Filed: Nov. 3, 2009

(65) Prior Publication Data

US 2011/0103301 A1    May 5, 2011

(51) Int. Cl.
  *H04B 3/10*    (2006.01)
(52) U.S. Cl.
  USPC .......................................... 370/491; 370/500
(58) Field of Classification Search
  USPC .............. 370/310.2, 324, 328, 329–339, 349,
           370/350, 491, 500, 503–520; 455/13.2, 208,
                          455/265, 422.1, 502
  See application file for complete search history.

(56) References Cited

U.S. PATENT DOCUMENTS

| | | | | |
|---|---|---|---|---|
| 2006/0062178 | A1* | 3/2006 | Jou | 370/328 |
| 2008/0020792 | A1* | 1/2008 | Falk et al. | 455/517 |
| 2009/0286564 | A1* | 11/2009 | Ho | 455/502 |
| 2010/0177842 | A1* | 7/2010 | Chang et al. | 375/295 |
| 2010/0234063 | A1* | 9/2010 | Mueck et al. | 455/552.1 |
| 2010/0284443 | A1* | 11/2010 | Rosenqvist et al. | 375/147 |
| 2011/0026503 | A1 | 2/2011 | Mueck et al. | |
| 2011/0069667 | A1* | 3/2011 | Grovlen et al. | 370/329 |

OTHER PUBLICATIONS

IEEE P1900.4 published on Feb. 27, 2009, and entitled "*IEEE Standard for Architectural Building Blocks Enabling Network-Device Distributed Decision Making for Optimized Radio Resource Usage in Heterogeneous Wireless Access Networks.*" 131 pages.

* cited by examiner

*Primary Examiner* — Hoon J Chung
(74) *Attorney, Agent, or Firm* — Fay Kaplun & Marcin, LLP

(57) ABSTRACT

Methods and apparatus for the resource-efficient reception of selected segments of system information in receivers. In one embodiment, a wireless device can automatically receive and store segments of pilot channel information, which may be decoded at a later time. By time-shifting the decoding of pilot channel information (or selectively obviating portions thereof based on "intelligent" filtering), the wireless device can reduce the radio and processing burdens for monitoring radio channels. In one variant, the majority of the wireless device can power down for a "snoozing" mode, wherein the device wakes at a later point in order to decode the cached context information data. Various methods for selectively receiving and filtering context information for storage are also disclosed, as well as network apparatus and associated business methods.

14 Claims, 15 Drawing Sheets

METHODS AND APPARATUS FOR RECEPTION OF DYNAMIC INFORMATION BY INACTIVE RECEIVERS

RELATED APPLICATIONS

This application is related to co-owned and co-pending U.S. patent application Ser. No. 12/512,761 filed Jul. 30, 2009 and entitled "Methods and Apparatus for Providing Dynamic Information in a Wireless Information Channel", incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the invention is directed to methods and apparatus for automatic reception of selected segments of information (e.g., system information) in receivers, such as may be useful for inter alia improving power consumption, and/or minimizing processor burden.

2. Description of Related Technology

Universal Mobile Telecommunications System (UMTS) is an exemplary implementation of a "third-generation" or "3 G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to fourth generation (4G) technology.

A current topic of interest is the further development of UMTS towards a mobile radio communication system optimized for packet data transmission through improved system capacity and spectral efficiency. In the context of 3GPP, the activities in this regard are summarized under the general term "LTE" (for Long Term Evolution). The aim is, among others, to increase the maximum net transmission rate significantly in the future, namely to speeds on the order of 300 Mbps in the downlink transmission direction and 75 Mbps in the uplink transmission direction.

Information and Pilot Channels

Information channels (such as Pilot Channels) are used in many prior art cellular mobile radio communication systems. Such channels provide user equipment (UE) with useful information such as for example broadcasts of basic system information. Such information may be crucial during, inter cilia, initial "wake-up" and registration, estimating potential base station (BS) service reception for handover (i.e. handoff), etc. Various approaches to information (e.g., pilot) channel messaging are evidenced throughout the prior art. For example, in Interim Standard 95 (IS-95, CDMA), a pilot channel is used by mobile devices to initially determine the existence of base stations, and/or support multipath compensation.

Unfortunately, such information channels have a relatively high cost in terms of bandwidth when compared to other useful data channels. Generally speaking, these channels are the most robust and simplest coded channels of the network. When compared to the rest of the network bandwidth utilization (which is densely coded), the information distribution (pilot) resources are significantly underutilized. In some cases, a cellular pilot channel may use up to a fifth of the overall spectral resources, while providing little to no additional information to the user equipment (UE) population during normal operation.

Recently, significant research has been conducted to improve the utilization of information and pilot channels. For example, proposed improvements to pilot channels increase the information capacity of pilot channel messaging. Such proposed pilot channels have the potential to provide significant benefits for devices that are actively receiving and monitoring the pilot channel. However, these performance improvements have tradeoffs that adversely affect inactive devices.

For example, idle UEs infrequently "wake-up" to monitor network status. By increasing the pilot channel messaging, idle UEs have a greater decoding burden for negligible gain. Similarly, unconnected devices may be interested in monitoring the status of nearby networks (such as for later handover, ad hoc networking, etc.), but constant monitoring of unrelated pilot channel messaging may not be worth the extra operational burden. Existing solutions inefficiently dedicate radio resources for scanning neighboring information channels (e.g., there is a relatively low probability of successful detection, and neighboring pilot channel information provides very little useful information).

Thus, tradeoffs between the amount of information in an information channel, and the relative cost of extracting the information, continues to limit the feasibility of increased information channel complexity. Accordingly, improved methods and apparatus are needed to, inter alia, support improvements to pilot channel functionality, while still minimizing the impacts of such changes on inactive or uninterested receivers.

SUMMARY OF THE INVENTION

The present invention satisfies the aforementioned needs by providing, inter alia, improved apparatus and methods for automatically receiving selected segments of publicly broadcast information (e.g., system information), such as via a pilot or other information channel, by receivers.

In a first aspect of the invention, apparatus for use in a wireless network is disclosed. In one embodiment, the apparatus includes: a wireless network interface; a first storage medium; a contextual information detector coupled to both the wireless network interface, and the first storage medium; a power supply; and a processing apparatus coupled to both an instruction storage medium, the power supply, and the wireless network interface, the processing apparatus having at least two power modes comprising at least a normal mode, and a low power mode. The instruction storage medium has at least one computer program stored thereon comprising a plurality of computer executable instructions that, when executed by the processing apparatus: responsive to entering the normal mode, fetches one or more contextual information elements stored in the storage medium; and prior to entering the low power mode, configures the contextual information detector to autonomously store received contextual information to the first storage medium.

In one variant, the apparatus includes a mobile device configured for use in a cellular network, the power supply includes a rechargeable battery, and the contextual information is at least a portion of a cognitive pilot channel (CPC) transmission. Implementation of the low power mode increases the life of an electrical charge of the battery as compared to the apparatus operating to receive CPC transmissions without the low power mode.

The fetch of one or more contextual information elements is performed e.g., during initialization.

Moreover, the first storage medium may comprise the same device as the instruction storage medium, or different ones (e.g., the first storage medium is a FIFO buffer, and the instruction storage medium is a separate program memory).

In another variant, the contextual information is obtained from at least one received cognitive pilot channel (CPC) frame. The received cognitive pilot channel (CPC) frame includes e.g., a preamble and at least one pointer, the at least one pointer referencing at least a portion of the contextual information.

In a second aspect of the invention, a contextual information apparatus for use in a wireless network is disclosed. In one embodiment, the apparatus includes: a wireless network interface; a contextual information storage medium; a contextual information detector coupled to both the wireless network interface, and the contextual information storage medium; and a processing apparatus in data communication with both an instruction storage medium and the wireless network interface, the processing apparatus having at least two operational modes comprising at least an online mode, and an offline mode. The instruction storage medium includes at least one computer program stored thereon, the at least one computer program configured to, when executed by the processing apparatus: during offline mode, identify one or more interest criteria; and during online mode, detect contextual information based on the one or more interest criteria.

In one variant, the apparatus includes a mobile device configured for use in a cellular network; the contextual information is at least a portion of a cognitive pilot channel (CPC) transmission, and implementation of the offline mode power consumption rate of the apparatus as compared to the apparatus operating to receive CPC transmissions without the offline mode.

In another variant, the detection of the contextual information during the online mode is obtained from at least one cognitive pilot channel (CPC) frame received over the wireless interface. The received at least one cognitive pilot channel (CPC) frame includes e.g., a preamble and at least one pointer, the at least one pointer referencing at least a portion of the contextual information.

In another variant, the at least one CPC frame includes a preamble, and the one or more interest criteria are at least partly reflected within information contained in the preamble. The one or more interest criteria are used in one implementation to determine whether the CPC frame should be stored in the contextual information storage medium or not, before storage therein.

In another variant, the one or more interest criteria are related to the priority or urgency of the CPC frame.

In a third aspect of the invention, a wireless base station apparatus is disclosed. In one embodiment, the apparatus includes: a wireless transceiver; a processor in data communication with the wireless transceiver; a storage medium in data communication with the processor, the storage medium comprising at least one computer program stored therein. The at least one program is configured to, when executed by the processor, generate a cognitive pilot channel (CPC) frame comprising a preamble and at least one context information element, at least the preamble enabling a receiving client device to selectively monitor for CPC frames of interest thereto without having to perform at least some decoding of the CPC frame.

In one variant, the at least some decoding includes any decoding (i.e., no decoding is performed).

In another variant, the base station apparatus is compliant with Long Term Evolution (LTE) standards, and the receiving client device includes user equipment (UE) subscribed to an LTE-based cellular network with which the base station apparatus is associated.

In yet another variant, the preamble comprises phase information used to determine whether the CPC frame is of one type or another.

In a fourth aspect of the invention, a wireless receiver apparatus is disclosed. In one embodiment, the receiver apparatus includes: an antenna; a preamble detection circuit in signal communication with the antenna; a storage apparatus in operative communication with the apparatus, and decoding resources in operative communication with the apparatus. The apparatus is configured to selectively monitor for data frames of interest using at least the preamble detector.

In one variant, the apparatus is further configured to selectively store data frames received via the antenna within the storage apparatus based at least in part on a preamble detected within the received frames.

In another variant, the preamble detection circuit is in data communication with the storage apparatus, and in switched communication with the decoding resources.

In yet another variant, the antenna, preamble detection circuit, storage apparatus, and decoding resources are disposed in serial fashion.

In still a further variant, the storage apparatus and the preamble detection circuit are both in signal communication with the antenna substantially in parallel, and the decoding resources are in data communication with both the preamble detection circuit and storage apparatus also substantially in parallel.

In a further variant, the preamble detection circuit is in communication with the antenna, and the decoding resources are in communication with the preamble detection circuit, and the storage apparatus is in data communication with the decoding resources.

In a fifth aspect of the invention, a method of operating a wireless receiver is disclosed. In one embodiment, the method includes: receiving a plurality of data frames that were received over an antenna associated with the receiver, at least some of the frames having a preamble; selectively evaluating the preambles of the at least some data frames to determine if the frames are of interest based on at least one criterion; and for those frames determined to be of interest, selectively decoding at least portions of those frames.

In one variant, the selective decoding further includes powering up decoding resources that were not powered up when the frames were received.

In a second embodiment, the method includes: receiving a plurality of data frames that were received over an antenna associated with the receiver, at least some of the frames having a preamble; storing the plurality of frames in a storage device; evaluating the preambles of the stored frames to determine if the frames are of interest based on at least one criterion; and for those frames determined to be of interest, selectively decoding at least portions of those frames.

In one variant, at least the evaluating of the stored frames is performed at a time subsequent to the storage of all the stored frames.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
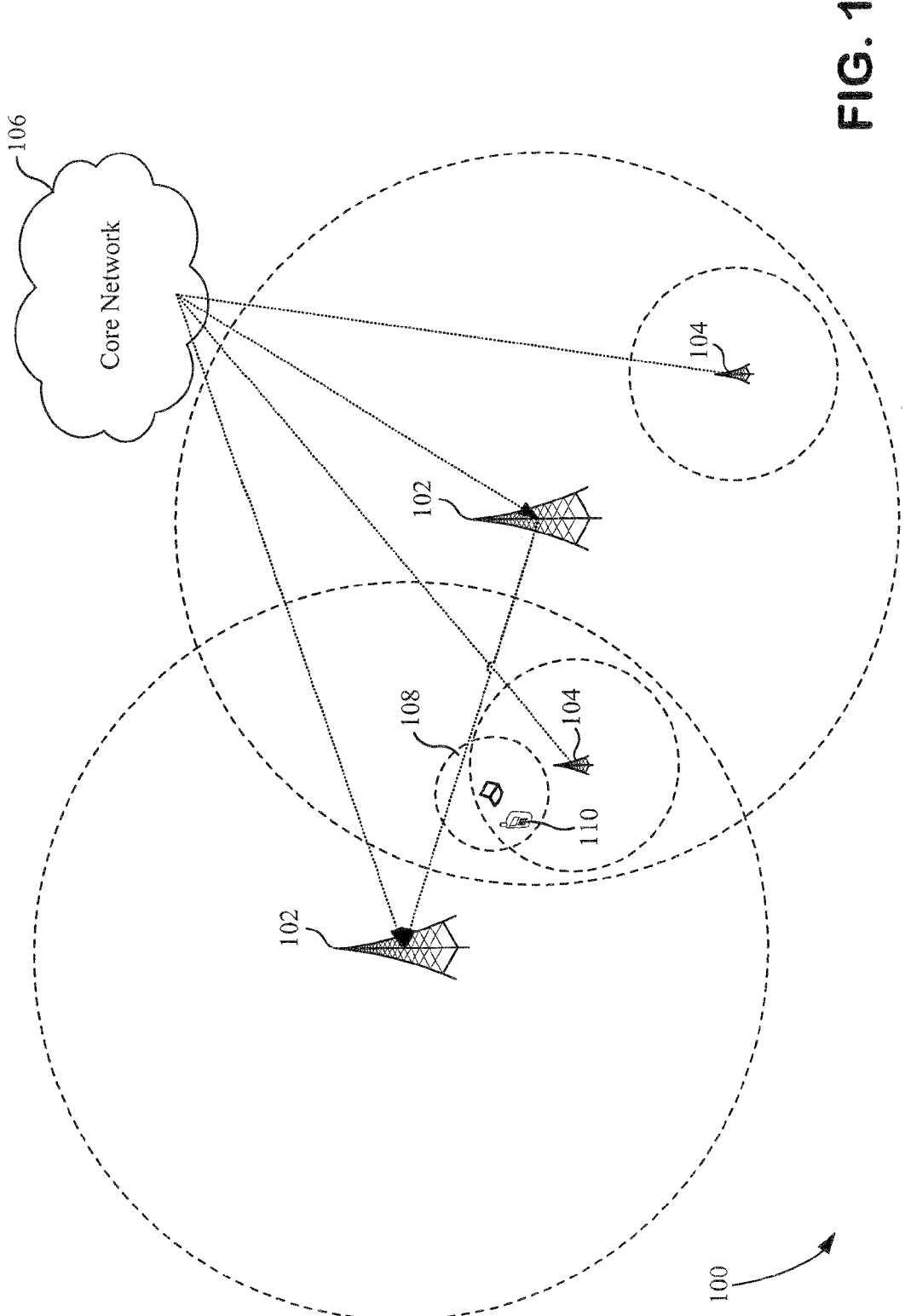
FIG. 1 is a graphical representation of an exemplary heterogeneous Radio Access Network (RAN) providing a first, second and third different Radio Access Technologies (RATs), useful for implementing one or more aspects of the present invention.

Reference is now made to the drawings, wherein like numerals refer to like parts throughout.

Overview

The present invention discloses, inter alia, methods and apparatus for automatic reception of selected segments of information (such as system information) in receivers. The exemplary embodiments of the present invention efficiently use a low-complexity preamble detector and cache memory for monitoring and recording information channels. The simplicity and configurability of these implementations can flexibly adapt to support complex pilot channel functionality, without undue burden on inactive or uninterested receivers. The invention in one variant provides "time-shifting" for pilot channel reception, which enables a receiver to decode the pilot channel information freely. By minimizing scheduling constraints on the wireless device, the wireless device can continue its then-current tasks without interruption, thereby minimizing unnecessary context switching. Furthermore, the device does not need to remain up-to-date constantly; instead, the device can ignore updates until action is required; and then, retroactively "rewind" and decode only the most recent updates.

For example, as discussed hereinafter in greater detail, a "snoozing" client device only powers on preamble detection components necessary for reception of nearby CPC context; other portions of the device can be wholly powered down. At a later point, once the device has "woken up", then the client device retrieves the latest updates, and commences operation normally. Such snooze-mode operation does not require active reception of the CPC. Instead, only the preamble detector and cache memory are required. In other examples, an enabled client device may receive and cache CPC context information for later use. Thus, a client device can connect to a first network, and monitor CPC context information in a second network, simultaneously. Several different scenarios disclose various methods for discovery of, and connection to, third-party networks.

In conjunction with caching and time-shifted decoding of pilot channel information, the client configured according to the exemplary embodiment of the invention is further able to selectively receive CPC information, based on predetermined criteria. Selective reception of various CPC segments and or CPC transmissions is particularly useful when used in combination with non-standardized CPCs, the latter which may vary widely in terms of scope and properties.

Furthermore, implementation-specific discussions provided herein detail various embodiments of preamble detectors, cache memory, and receiver topologies.

DETAILED DESCRIPTION OF EXEMPLARY EMBODIMENTS

Exemplary embodiments of the present invention are now described in detail. While these embodiments are primarily discussed in the context of third generation UMTS wireless networks (3G), LTE (3.9G) and fourth generation LTE-A (4G) networks (and more specifically in one embodiment to the segmented public broadcast mechanisms of co-owned and co-pending U.S. patent application Ser. No. 12/512,761 filed Jul. 30, 2009 and entitled "Methods and Apparatus for Providing Dynamic Information in a Wireless Information Channel" previously incorporated by reference herein in its entirety), it will be recognized by those of ordinary skill that the present invention is not so limited. In fact, the various aspects of the invention are useful in any wireless network that can benefit from the configurable/automatic information channel reception for receivers described herein.

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Furthermore, as used herein, the term "network" refers generally to any type of data, telecommunications or other network including, without limitation, data networks (including MANs, PANs, WANs, LANs, WLANs, P2P networks, micronets, piconets, internets, and intranets), satellite networks, cellular networks, and telco networks.

Moreover, as used herein, the terms "segmented public broadcast information", "segmented publicly broadcast", "segmented pilot channel", and "Cognitive Pilot Channels (CPC)" refer without limitation to any type of transmission which is received by one or more user groups in a wireless communication network or parts thereof. Such (generalized) user groups may include user class, subscription type, location, etc. Segmented public broadcasts may not be of interest to all users, yet they may be useful for potentially any user. Accordingly, such segmented public broadcasts are not "addressed" to any specific user(s). The following examples are provided to further clarify publicly broadcast information (see also U.S. patent application Ser. No. 12/512,761 filed Jul. 30, 2009 and entitled "Methods and Apparatus for Providing Dynamic Information in a Wireless Information Channel" previously incorporated by reference).

Segmented public broadcast information may be segmented by user class, e.g. by subscriber status. For example, one such exemplary scheme would designate "gold" and "silver" users, each of which is allowed different services. Accordingly, information transmitted for "gold" users, may not be received by "silver" users, and vice versa.

Segmented public broadcast information may require subscription for reception. For example, a third-party service provider (which may be different from the mobile network operator) may provide supplemental service, and a corresponding CPC service. Wi-Fi™ hotspots are one common example of services provided by such third-party service providers. Users interested in receiving the supplemental services may also choose to receive the corresponding CPC service. Uninterested users may simply ignore the CPC service.

Segmented public broadcast information may be localized, or geographically limited in use. For example, a hospital may force UEs to reduce their output power. Similarly, segmented public broadcast information may be useful only in certain directions, or at cell boundaries (e.g., to facilitate handoff).

As used in the present context, the term "inactive" refers without limitation to any receiving device which does not have an active radio connection with the network. Thus, devices operating in "idle" modes are inactive, as are devices which are unconnected to the network. It is further recognized, that in heterogeneous networks, a receiver may be "active" in some networks, and "inactive" in other networks.

As used in the present context, the terms "snooze-mode", "snoozing", "snoozed", etc. refer without limitation to any inactive receiver which stores segmented public broadcasts for subsequent decoding. Various other aspects of snooze-mode operation, and its respective uses, etc. will be apparent to those skilled in the arts, given the present disclosure.

Exemplary Cellular Network Architecture

In the following discussion, a cellular radio system is described that includes a network of radio cells each served by a transmitting station, known as a cell site or base station (BS). The radio network provides wireless communications service for a plurality of user equipment (UE) transceivers. The network of BSs working in collaboration allows for wireless service which is greater than the radio coverage provided by a single serving BS. The individual BSs are connected by another network (in many cases a wired network), which includes additional controllers for resource management and in some cases access to other network systems (such as the Internet or MANs).

In a UMTS system, a base station is commonly referred to as a "NodeB". The UNITS Terrestrial Radio Access Network (UTRAN) is the collective body of NodeBs along with the UMTS Radio Network Controllers (RNC). The user interfaces to the UTRAN via a UE, which in many typical usage cases is a cellular phone or smartphone. However, as used herein, the terms "UE", "client device", and "end user device" may include, but are not limited to, cellular telephones, smartphones (such as for example an iPhone™), personal computers (PCs), such as for example an iMac™, Mac Pro™, Mac Mini™ or MacBook™, and minicomputers, whether desktop, laptop, or otherwise, as well as mobile devices such as handheld computers, PDAs, personal media devices (PMDs), or any combinations or variants of the foregoing.

LTE networks are based on their UNITS predecessors, and referred to as "3.9G" networks. FIG. 1 illustrates an exemplary LTE cellular system 100 within which the present invention can be employed, with a focus on the radio access network (RAN). The RAN includes three (3) Radio Access Technologies (RATs). Each RAT has significant differences in operation. A first UE 110 is shown, operating within the coverage of all three networks.

The system 100 includes one or more base station towers 102 (also known as enhanced-NodeBs (eNBs)), that are set at various fixed geographic locations. Such eNBs may also be generally referred to as a "macrocell". Furthermore, LTE standards have provisioned for the operation of a new network entity, the Home enhanced-NodeB (HeNB) 104, which is a miniaturized version of an eNB. The HeNB is also commonly referred to as a "femtocell"; a femtocell provides similar functionality to a macrocell, but at a reduced capability and cost, and may be portable versus fixed. Femtocells may be purchased by a customer for personal use. The combination of eNBs and HeNBs provide a seamless, cohesive service from a network operator. The network operator manages network operation via a Core Network 106. The unified Core Network provides authentication, accounting, and authorization (AAA) services, and in some cases, access to external networks (e.g. such as IP Multimedia Subsystems (IMS) services as specified by the 3GPP).

Each of the eNBs 102 and HeNBs 104 are directly coupled to the Core Network 106 e.g., via broadband access. Additionally, in some networks the eNBs may coordinate with one another, via secondary access. In the illustrated RAN 100 of FIG. 1, the HeNBs are connected to the Core Network, but are not linked to the other entities of the network (e.g., the eNBs). In other network embodiments, HeNB-eNB connections may be implemented. Unlike the broader coverage of the eNBs, a HeNB is generally focused on improving service to a few subscribers. Accordingly, HeNBs may have settings and limitations which are not applicable for the general population. Such non-standard settings are generally disclosed, at least in part, within the pilot channel public broadcasts. Accordingly, the eNB and the HeNB generally have different pilot channel payloads (e.g., context information).

Furthermore, also shown in FIG. 1 is an out-of-network service, provided by a wireless ad hoc network 108 (e.g., Wireless Local Area Network or WLAN). Such ad hoc networks are often not coupled to any higher entity, and widely vary in services provided, authentication, authorization, etc. Accordingly, the ad hoc network may also have significantly different pilot channel information than that of either the eNBs 102 or the HeNBs 104.

Ideally, neighboring base stations having overlapping coverage areas should peacefully coexist, and work to minimize Intra-Cell Interference (ICI). Thus, when a UE enters a region of overlapping service, the UE may select (or be transferred) to the optimal base station (e.g., the base station which minimizes transmit and receive power, which is minimally loaded, and/or optimizes one or more other parameters). Similarly, in mixed networks (i.e., where multiple networks coexist), the UE should efficiently select from the available resources of the disparate networks. While a UE may maintain links to multiple distinct networks to maximize the overall UE data rates, more commonly the UE will choose (or be triggered to perform a "vertical handover" to) the stronger radio link. Vertical handovers are significantly more complex than typical handovers. A vertical handover generally requires a complete shift from one radio access technology to another. Vertical handovers are also referred to as "Inter-Radio Access Technology (Inter-RAT) Handovers" in 3GPP terminology.

Upon inter-RAT cell re-selection, or during vertical handovers from a current network to a "new" network, the UE must obtain the relevant context information for the new network. Typical solutions to this requirement include: (i) the UE identifying the context information itself, (ii) the network providing the context information to the UE, or (iii) a hybrid combination of the previous two options. In the first solution (i), for a UE to identify the context information, the UE must scan the radio environment. This is often costly in terms of hardware resources, battery consumption, etc. Alternatively, the second solution (ii) requires the network to broadcast the context information "blindly"; the network must provide the entirety of its context information all the time. Understandably, such blind transmissions are often wasted and are also generally inefficient. Hybrid variants (iii) suffer many of the same foregoing limitations.

Cognitive Radio

Cognitive radio is a term generally used to describe a network or wireless node which intelligently alters its wireless communication to, inter alia, avoid interference. Cognitive radio may actively monitor several factors in the external and internal radio environment (such as radio frequency spectrum, user behavior, network state, etc.).

The computational complexity of much cognitive radio theory has rendered its implementation impractical in the past. However, recent advances in the digital electronics arts have greatly contributed to modern cognitive radio developments. For example, significant research has already been conducted on so-called Cognitive Pilot Channels (CPCs). Accordingly, the incipient standards for advanced radio networks have proposed that a CPC should comprise a context provisioning signal for any legacy and future Radio Access Technologies (including LTE).

Extant modes of CPC operation are divided into "dedicated" CPCs (CPC), and "virtual" CPCs (V-CPC). A dedicated CPC relies on a dedicated physical channel, or radio resource for the transmission of CPC information. In contrast to dedicated CPCs, a V-CPC encapsulates the CPC content within one or more generic radio resources (i.e., the V-CPC is treated as a data payload). V-CPCs are significantly more flexible than traditional dedicated CPCs, and are network agnostic (i.e., may be used to span different networks). As used herein, the terms "CPC" and "V-CPC" describe implementation specific embodiments, and are interchangeable in functionality.

One CPC-specific implementation, useful for illustrating various aspects of the present invention, is organized as a segmented CPC that rotates through varying portions of context information for transmission. A first portion of the context information may rarely change (e.g., parameters of cellular networks), while other portions may change quite frequently (e.g., the load level of WLAN systems). Consequently, a UE which is newly acquiring the CPC should decode the entire CPC. However, UEs which have been "camping" (i.e., in RRC_IDLE state) or operating for some time (i.e., RRC_CONNECTED) on the same cell, or in the same geographical area, will have already decoded the "old" context information, and need only to recover the latest updates.

As used herein, the term "context information" includes, but is not limited to, data payloads useful for, inter alia, identifying information pertinent to one or more aspects of the wireless network or subscriber classes. Exemplary embodiments of context information are described in IEEE P1900.4 published on Feb. 27, 2009, and entitled "*IEEE Standard for Architectural Building Blocks Enabling Network-Device Distributed Decision Making for Optimized Radio Resource Usage in Heterogeneous Wireless Access Networks*", incorporated herein by reference in its entirety. The aforementioned publication describes context information including: CWN (Composite Wireless Network), Operator, Operator Profile, Operator Capabilities, Assigned Channel, Assigned Channel Profile, Regulatory Rule, SA Policy, RAN, RAN Profile, RAN Configuration, Base Station, Base Station Capabilities, Base Station Configuration, Base Station Measurements, Cell, Cell Profile, Cell Capabilities, Cell Configuration, Cell Measurements, etc.

Exemplary Cognitive Pilot Channel

Figure 2:
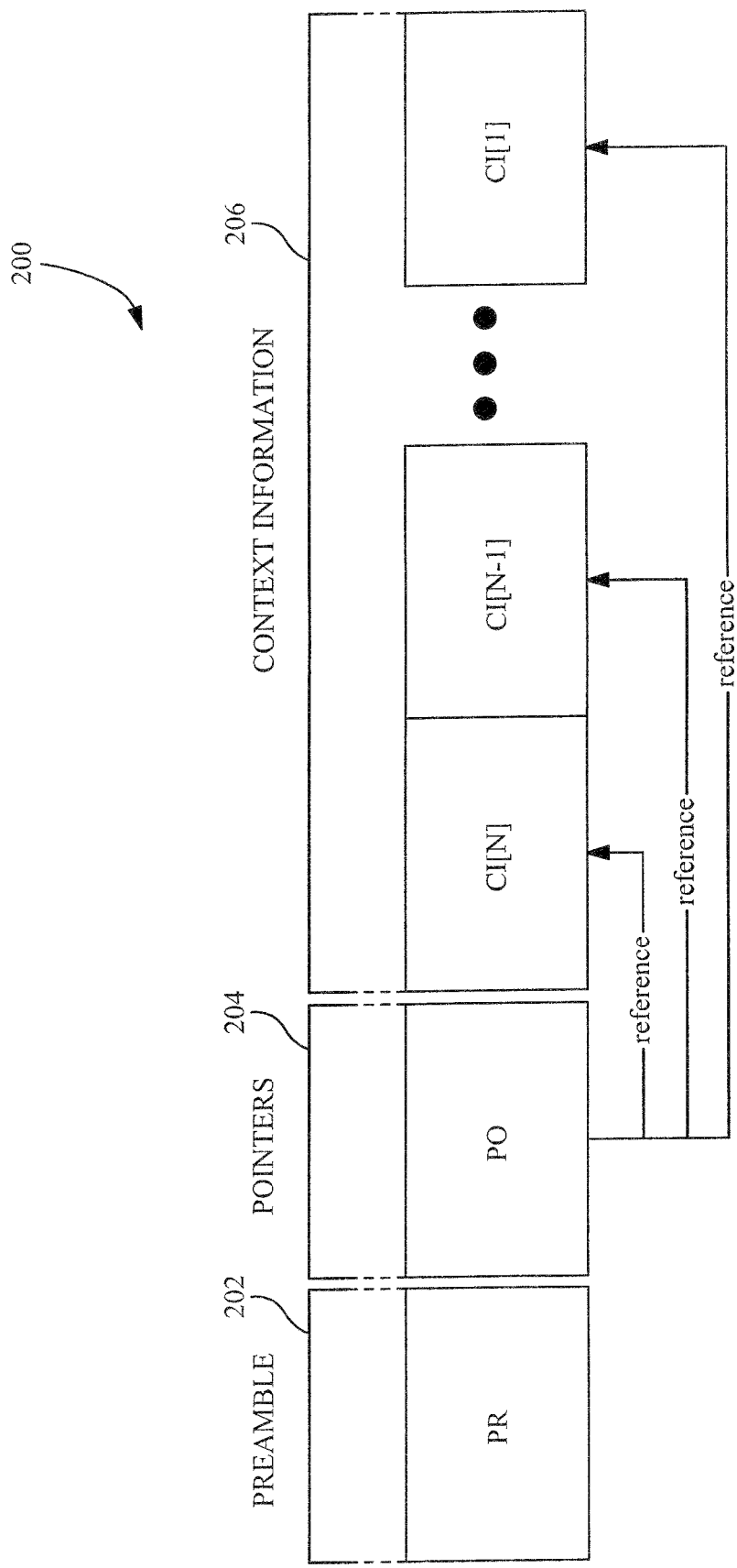
FIG. 2 is a graphical representation of one exemplary embodiment of a Cognitive Pilot Channel (CPC) Frame and its constituent subcomponents or "segments", in accordance with the present invention.

Referring now to FIG. 2, a first exemplary format of a CPC frame 200 is shown depicting three (3) components: a preamble 202, one or more pointers 204, and a plurality of context information 206.

In the first CPC frame 200, a series of pointers 204 are provided for a UE to identify the appropriate context information 206 of interest. Each pointer 204 provides an index which references a distinct location. For example, the index may be based on an age level. Such age levels may comprise the qualitative values: "new", "recent", "old", and "very old", although other values may be substituted if desired. Other indexes are readily apparent to those skilled in the art, and may include gradations based on importance (e.g. "important", "not important", etc.), types of service (e.g. "lte", "umts", "gprs", "wlan", "wimax", etc.), types useful for business methods (e.g., "gold", "silver", "vip", etc.), types of devices (e.g., "user equipment", "machine client", etc.), etc. Moreover, while the foregoing instances of indexes are generally "qualitative" value variables, it will be appreciated that deterministic or numeric variables or systems may be applied (e.g., according to a linear numeric scale, etc.)

Figure 3:
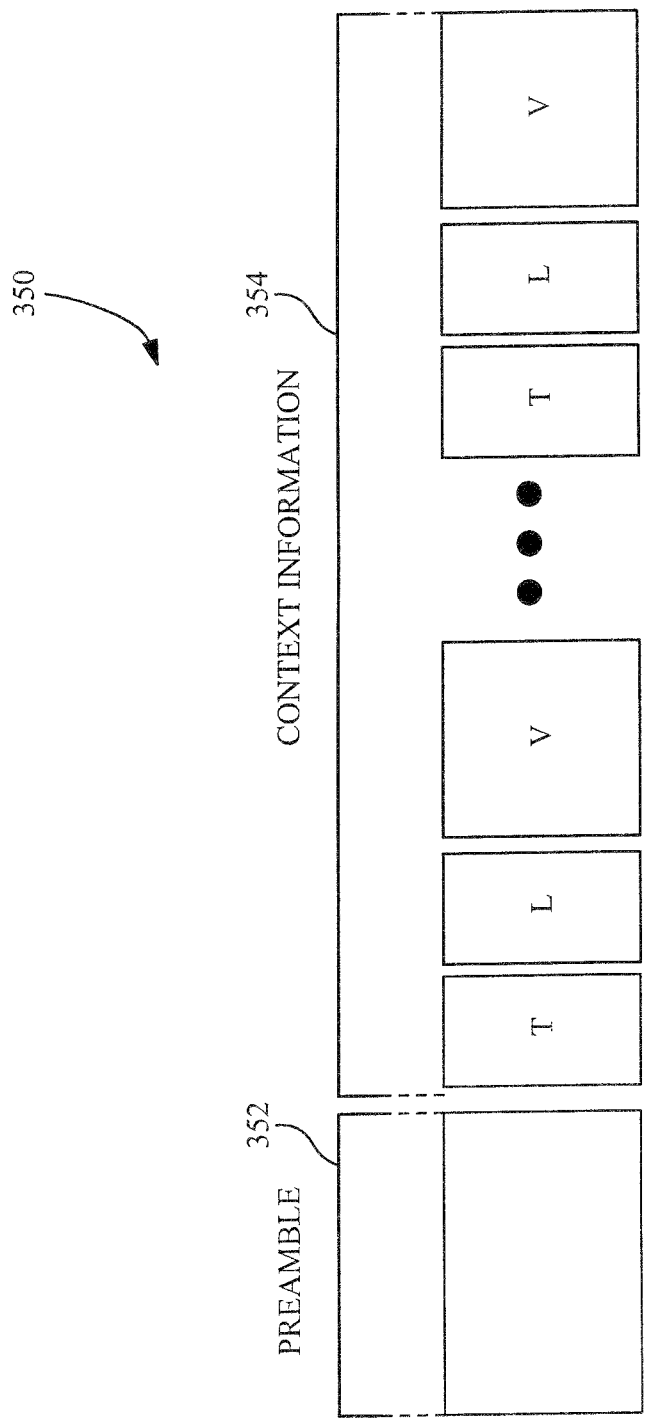
FIG. 3 is a graphical representation of an alternate embodiment of a Cognitive Pilot Channel (CPC) Frame and its constituent Tag Length Value (TLV) components, in accordance with the present invention.

Referring to FIG. 3, a second exemplary format for a CPC frame 350 is shown, depicting two (2) components: a preamble 352, and one or more Tag Length Value (TLV) objects 354. Each TLV object includes: a binary token or name of the segment (tag), a length indication of the segment (length), and a payload (value). Furthermore, each of the TLV objects may comprise a number of hierarchically structured smaller TLV objects (i.e., the TLV may include a "nested" data structure).

Similar to the pointer scheme of FIG. 2, the tags of FIG. 3 are used to distinctly identify the TLV content. For example, a tag may indicate an age level. Such age levels may comprise in one embodiment the qualitative values: "new", "recent", "old", and "very old", although other values may be substituted if desired. Other tags are readily apparent to those skilled in the art, and may include gradations based on importance (e.g. "important", "not important", etc.), types of service (e.g. "lte", "umts", "gprs", "wlan", "wimax", etc.), types useful for business methods (e.g., "gold", "silver", "vip", etc.), types of devices (e.g., "user equipment", "machine client", etc.), etc. Moreover, while the foregoing instances of tags are generally "qualitative" value variables, it will be appreciated that deterministic or numeric variables or systems may be applied (e.g., according to a linear numeric scale, etc.).

It will be appreciated that yet other frame formats may be used consistent with the present invention, such alternative formats being generally determined by the particular application, and readily implemented by those of ordinary skill when provided the present disclosure.

Time Varying CPC Frame Length

As previously mentioned, some types of context information change frequently, whereas other types of context information may change rarely, if at all. For example, context information regarding the occupation levels or constituency of a WLAN system may change quite frequently. Some network-specific context information (such as the Mobile Country Code (MCC)) for cellular networks changes infrequently, if at all. Thus, each segment of context information may have varying levels of importance, and/or frequencies of change.

Figure 4:
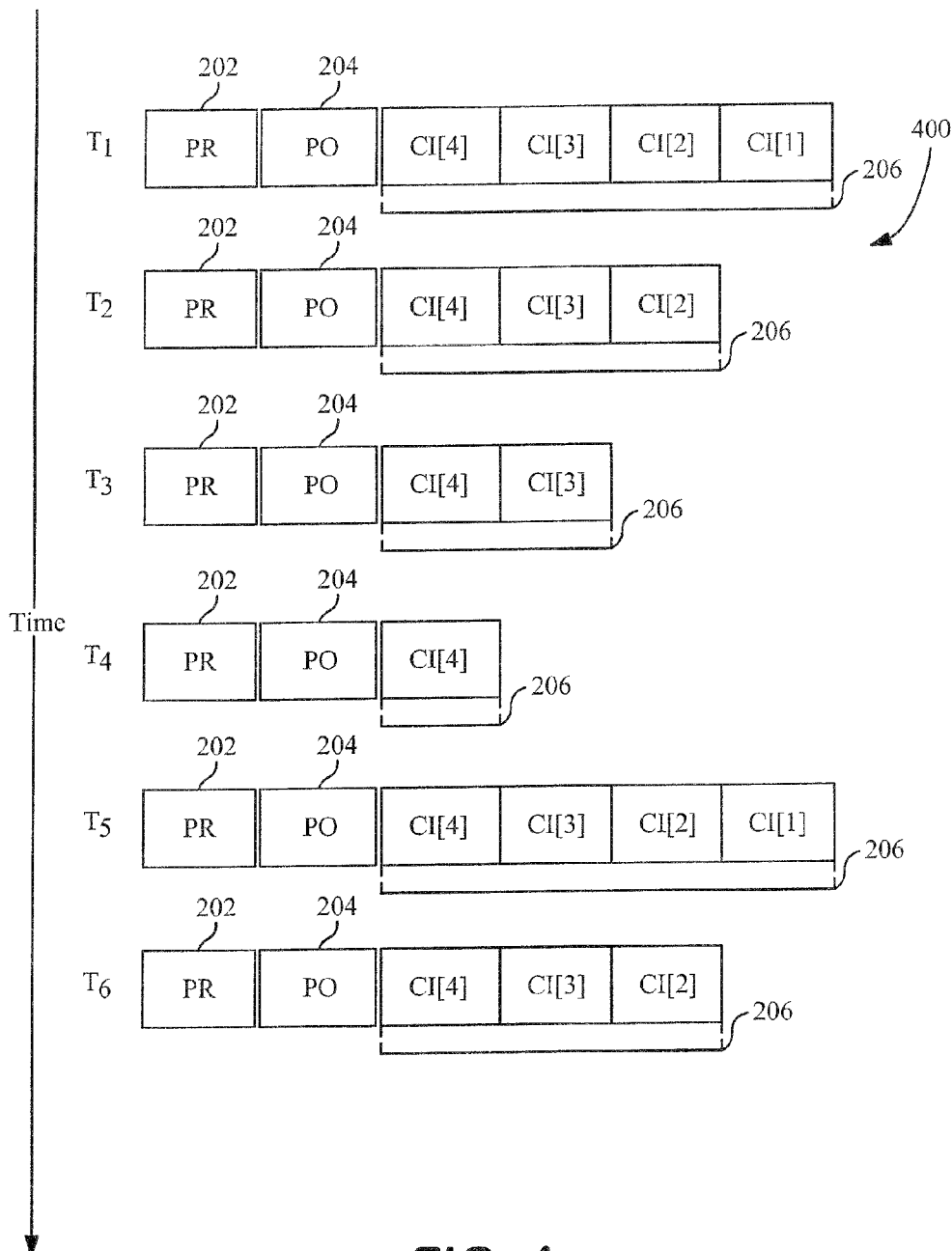
FIG. 4 is a graphical representation of one embodiment of a second sequence of transmissions of the exemplary CPC Frame of FIG. 2, where each subsequent transmission is decremented.

Referring now to FIG. 4, one embodiment of a time-varying context information scheme 400 for modifying the CPC frame length to convey varying amounts of context information is illustrated. At time $T_1$, a first CPC frame 200 is transmitted. At the second transmission time $T_2$, the context information of the first CPC frame is decremented. The context information CI[1] is not transmitted. The third transmission (at $T_3$) is decremented again (i.e., both CI[2], and CI[1] are excluded). Subsequent frame transmissions at $T_4$, $T_5$, and $T_6$ are shown for completeness.

Figure 5:
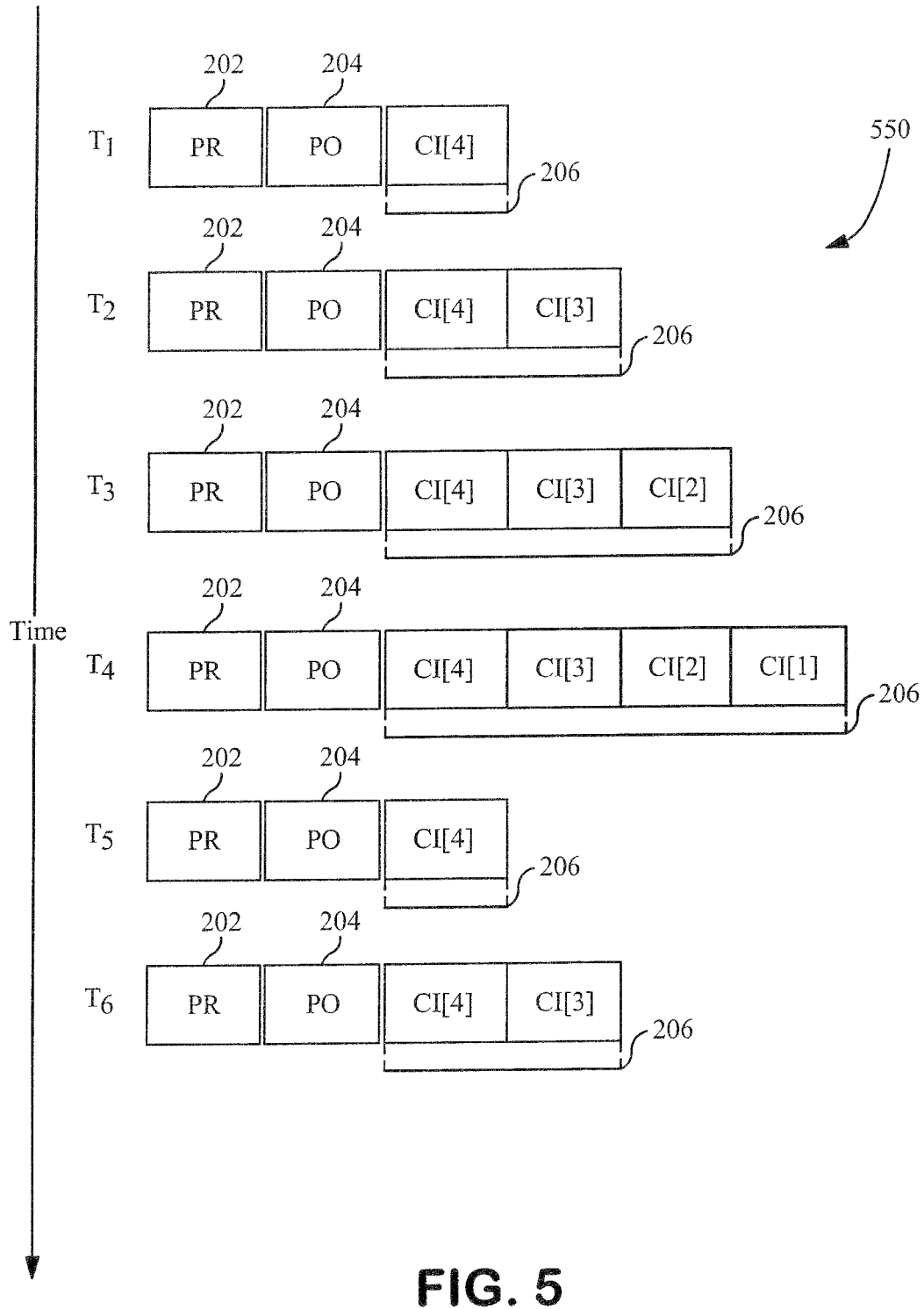
FIG. 5 is a graphical representation of another embodiment of a second sequence of transmissions of the exemplary CPC Frame of FIG. 2, where each subsequent transmission is incremented.

Similarly, as shown in FIG. 5, the time-varying context information scheme 550 is modified so as to increment context information (instead of decrementing context information as in FIG. 4). Specifically, at time $T_1$, a first CPC frame 200 is transmitted having a first segment of the entirety of the context information. At the second transmission time $T_2$, a second segment of the entirety of the context information of the first CPC frame is added. The third transmission (at time $T_3$) provides yet more information. Subsequent frame transmissions at $T_4$, $T_5$, and $T_6$ are shown for completeness. Such an embodiment may allow a UE to receive any transmission, and receive the contents of the preceding transmissions as well; e.g., a UE which receives transmission at time $T_3$, may opt to decode the context information of $T_1$, and $T_2$.

Other useful variations of CPC frame structures and their usage are discussed in greater detail within co-owned and co-pending U.S. patent application Ser. No. 12/512,761 filed Jul. 30, 2009 and entitled "Methods and Apparatus for Providing Dynamic Information in a Wireless Information Channel" previously incorporated by reference herein in its entirety; such variations also may be implemented within the context of the present invention. It will be recognized that the foregoing disclosed examples of various CPC frames are only illustrative of the broader possibilities for dynamically updating the context information of CPC frames.

Example Operation

Within the context of the previously discussed LTE network 100 utilizing the CPC frame 200 in a time-shifted scheme 400, the periodic transmission of CPC data still occurs quite regularly. Thus, prior art user equipment must schedule and devote resources to decode the CPC data transmission at regular intervals. However, the present invention reduces the scheduling constraints on the UE, by (i) caching CPC data for the UE to process at its leisure, and (ii) instructing dedicated preamble detection components to identify predetermined triggering criteria, to offload UE decoding burden.

More generally, the invention-enabled receiver or UE is adapted to automatically identify and/or collect segmented public broadcast information. In the exemplary embodiment, the receiver has a separate and distinct subsystem for performing initial processing, advantageously without requiring active involvement from the rest of the radio subsystem.

In one embodiment, an improved Software Defined Radio (SDR) capable UE device configures a low-complexity CPC preamble detector for reception and storage of CPC frame data. The low-complexity CPC detector may also be configured to trigger specific action upon reception of a CPC frame consistent with one or more selection criteria (e.g., transmission type, context information, etc.). In the following embodiment, the CPC preamble detector is a simple correlator device. However, other contemplated embodiments of the invention span an entire spectrum of functionality based on particular application considerations and constraints, including preamble detectors that can fully decode the CPC frame contents.

In the exemplary network 100 of FIG. 1, the heterogeneous network includes a first LTE eNB 102, a second LTE Home eNodeB (HeNB) 104, and a Wireless-LAN access point 108 (e.g., Wi-Fi AP). The first eNB and second HeNB are operating under the control of a single network operator. The WLAN AP is operating outside of the single network operator's control, and is privately administered by e.g., a home or business user. In the following discussions, the CPC broadcasts from the serving RATS (102, 104, 108) are based on the aforementioned CPC frame structure 200, as used within the time-varying scheme 400 prioritized by age level, although other prioritization schemes may be used consistent with the invention.

"Snooze" Mode and Cache Assisted Mode

In a first illustrative scenario, a "snoozing" client device 110 only powers on preamble detection components for reception of nearby CPC context information. During snooze-mode, the client device stores context information to a context memory or cache. Snooze-mode only requires operation of a low complexity preamble detector, and the context memory or cache. At wakeup, the contents of the context memory/cache are evaluated to immediately provide CPC information.

Referring to the system of FIG. 1, the snoozing UE 110 caches any CPC preambles received from the eNB 102, while ignoring CPC preambles from other sources (i.e., HeNB 104, WLAN AP 108). Once the UE powers on, the UE decodes the CPC preambles stored in memory. As the context memory contains a complete record of the eNB's previously transmitted CPCs, the UE is immediately up-to-date. Unlike typical operation, the CPC frame data is not decoded until the UE exits snooze-mode. Consequently, the UE only decodes the most recently sent information of interest; thus, snooze-mode can greatly reduce power consumption and associated processing.

In one exemplary embodiment, during snooze mode, the client device only powers on i) the RF components required to receive the CPC signal, ii) the A/D (Analog/Digital) converter and iii) a memory for storing A/D output data. Most notably, all other decoding subsections are powered-down. The decoding subsections (e.g., the baseband and modem) only decode the stored data at a later "time-shifted" point, only when necessary. Additionally, frame(s) of interest may be quickly identified using (e.g. correlation based) detection techniques described hereinafter.

More broadly, an invention-enabled client device may receive and cache CPC context information for later use. In a second illustrative scenario, a UE 110 operating in a cellular network stores all context information received from its serving eNB 102. The UE doesn't decode the raw data samples; instead, it stores the data samples in its cache memory for later use. At a later point, the UE 110 determines that it has moved, or is moving. Certain types of CPC information may be more relevant during movement (such as for example those described in co-owned and co-pending U.S. patent application Ser. No. 12/512,761 filed Jul. 30, 2009 and entitled "Methods and Apparatus for Providing Dynamic Information in a Wireless Information Channel", incorporated herein by reference in its entirety). Thus, the UE searches through its internally cached CPC information for applicable entries, and identifies CPC information with location specific data (e.g., a UE which is moving South of a base station gathers corresponding details about the radio landscape South of the base station, etc.). Because the CPC cache contains a complete record of previously transmitted CPCs, the UE has information immediately.

Predetermined CPC Decoding

In a third illustrative inventive scenario, the client 110 selectively receives CPC information, based on a predetermined criteria. CPC service may be provided by one or more third-party service providers (e.g., HeNB 104, WLAN AP 108). As can be appreciated, each device within a large population of client devices may have individually varying interests. Therefore, a client may identify its current level of knowledge, and its current application requirements. Based on this determination, the client can identify its areas of deficiency (e.g., out dated context information, or missing context information, etc.) and "predetermine" appropriate updates of interest.

Consider for example the community of networks 100, where the UE 110 actively operating in its current network with its eNB 102, may desire information about other networks. In one example, if each serving member of the networks transmits context information for all other members of the community of networks, then any client device that attaches to any network of the community can obtain CPC information for any other member network of the entire community of networks. Once the UE has determined the context information and the CPC schedule for the network of interest, the UE can tune in to the network for "piecemeal" reception of the CPC (i.e., only during CPC transmissions of segments of interest).

In other networks, such discovery can be performed using out-of-band services or service discovery programs operating on an existent data link (such as for example in one embodiment via the exemplary Bonjour protocol developed by the Assignee hereof). Out-of-band services include e.g., Bluetooth, Wi-Fi, etc. Other service discovery protocols exist, and are substantially interchangeable. However, Bonjour is advantageously already utilized in, inter alia, the Mac OS X operating system of the Assignee hereof (e.g., in one incarnation from version 10.2 onwards), and can also be used on Microsoft Windows® operating systems (when installed) as well as potentially other operating systems. Once the UE has identified the piecemeal segments of interest and CPC schedule, the UE can easily tune in to the scheduled CPC update for the desired network using the schedule information.

Exemplary SDR Client Apparatus

Several aspects of the present invention are now described in greater detail. In one embodiment of a client apparatus (e.g., UE), the apparatus stores publicly broadcasted information in a cache memory for later use. In one variant, the UE apparatus is further adapted for low power "snooze-mode" operation.

In another embodiment, the apparatus can be preprogrammed to specifically trigger action, based on predetermined context information, or indications of context information.

Figure 6:
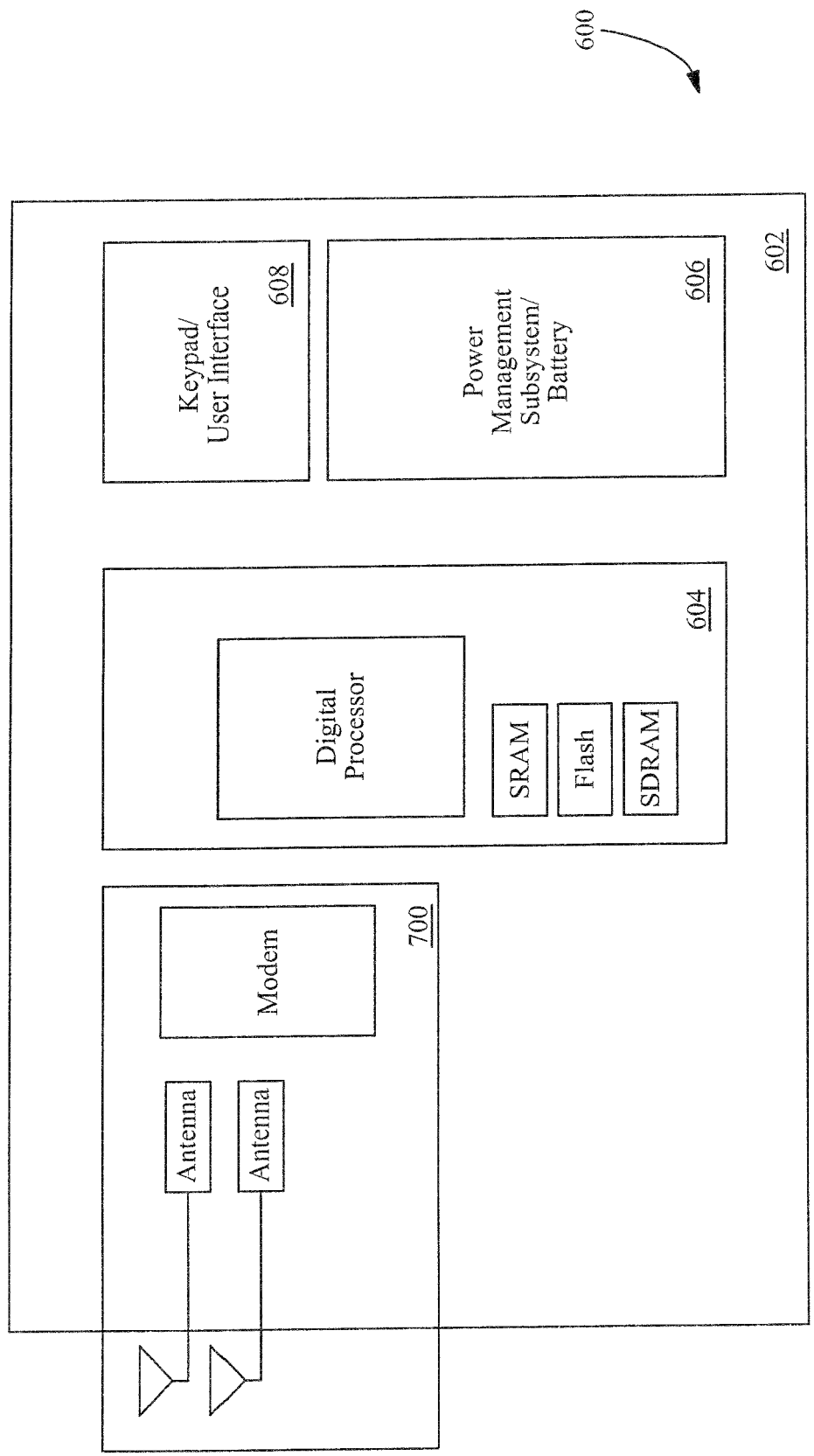
FIG. 6 is a functional block diagram illustrating one embodiment of a software defined radio (SDR) apparatus adapted to implement the methods of the present invention.

Referring now to FIG. 6, one exemplary client apparatus 600 useful in implementing the methods of the present invention is illustrated. In one embodiment, the apparatus is a client device such as a smartphone, portable computer, or mobile communications device capable of dynamic pilot channel reception. The configuration of pilot channel reception is preferably performed in software, although hardware/firmware embodiments are also envisioned herein.

The exemplary client apparatus 600 includes one or more substrate(s) 602 that further include a plurality of integrated circuits including a processing subsystem 604 such as a digital signal processor (DSP), microprocessor, programmable logic device (PLD), gate array, or plurality of processing components as well as a power management subsystem 606 that provides power to the apparatus 600, a user interface (UI) subsystem 608, and a radio modem subsystem 700. As used herein, the term "integrated circuit (IC)" refers to any type of device having any level of integration (including without limitation VLSI, VLSI, and LSI) and irrespective of process or base materials (including, without limitation Si, SiGe, CMOS and GaAs).

The processing subsystem may also comprise an internal cache memory. The processing subsystem 604 is connected to a memory subsystem comprising memory which may, for example, include SRAM, Flash and SDRAM components. The memory subsystem may implement one or a more of DMA type hardware, so as to facilitate data accesses as is well known in the art.

The user interface subsystem 608 includes any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card-type client embodiments may lack a user interface (as they could piggyback onto the user interface of the host device to which they are physically and/or electrically coupled).

The apparatus 600 may further include optional additional peripherals including, without limitation, one or more GPS transceivers, or network interfaces such as IrDA ports, Bluetooth transceivers, USB, FireWire™, WiMAX transceivers, etc. It is however appreciated that these components are not required for operation of the client in accordance with the principles of the present invention.

The illustrated power management subsystem (PMS) 606 provides power to the client, and may include an integrated circuit and or a plurality of discrete electrical components. In one exemplary portable apparatus, the power management subsystem 606 interfaces with a rechargeable battery power source within the apparatus. In one embodiment, the PMS includes the capability to provide power to separate sections of the apparatus. In one implementation, the PMS can individually power the portions of the radio modem subsystem (antenna assembly, preamble detector and cache assembly discussed in greater detail hereinafter). In another variant, the PMS can individually power the antenna assembly, preamble detector, cache assembly, and plurality of decoding resources. The PMS may be programmed with a predefined mode, where the pre-defined modes specify the appropriate power domains for various types of operation. In one such variant, the PMS can be programmed with a snooze-mode, which reduces or powers down all elements not directly involved in receiving and storing data transmissions.

Figure 7:
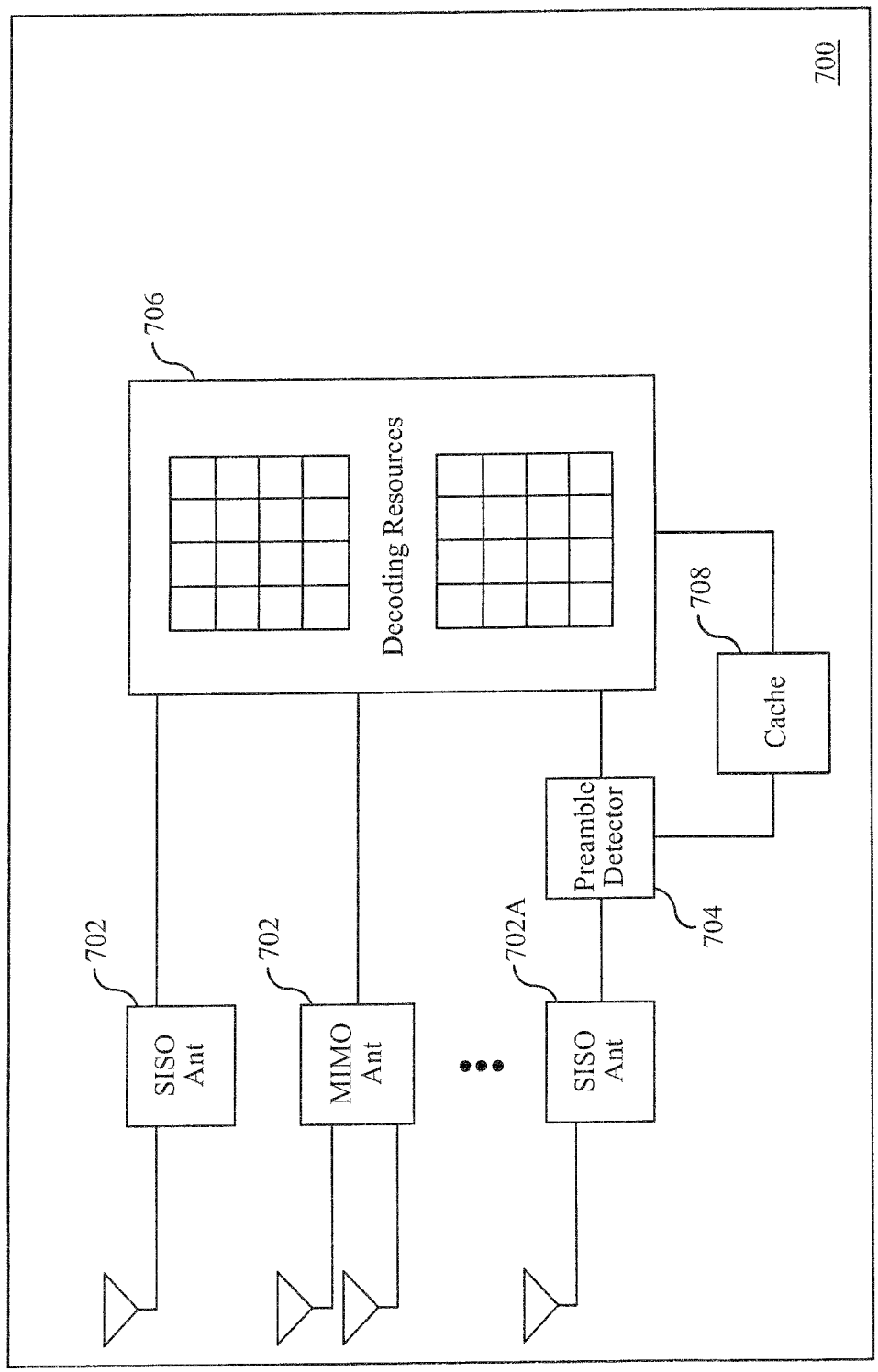
FIG. 7 is a functional block diagram further illustrating one embodiment of a Software Defined Radio (SDR) subsystem of the SDR apparatus of FIG. 6.

FIG. 7 illustrates one embodiment of the radio/modem subsystem 700 in greater detail, including a Software Defined Radio (SDR) subsystem architecture. The SDR subsystem includes four (4) distinct components: one or more RF front-ends 702, a preamble detector 704, a plurality of decoding resources 706, and a cache memory 708. In the illustrated example, the preamble detector is operatively coupled to a first RF front-end 702A, and the cache memory 708. The remaining RF front-ends are coupled directly to the plurality of decoding resources. In other embodiments, the preamble detector and or cache memory may be flexibly coupled to any one or more of the RF front-ends. Also, as shown, the cache memory is connected to the plurality of decoding resources. Other connection schemes are discussed subsequently, herein.

Each of the foregoing components is now discussed in greater detail.

Antenna, RF Front-End

The RF front-end 702 of the illustrated embodiments generally includes the antenna, and any analog stages used to convert a received radio signal to a digital signal. An RF front-end may include a wide variety of filters, amplifiers, analog-to-digital converters (A/D), digital-to-analog (D/A) converters (including e.g., direct or delta-sigma converters), mixers, multiplexers, duplexers, diplexers, etc. Due to the very specific nature of RF reception, RF front-ends are generally adapted to a very limited range of operation.

In some instances, multiple RF front-ends may be required for different radio frequencies, and or radio access technologies (RATs). For example, in the illustrated embodiment, the SDR apparatus has three (3) different RF front-ends: a first RF front-end dedicated to the reception of the dedicated CPC channel 702A, and multiple (2) second RF front-ends adapted to reception of other RATs. RF front-ends used in the invention may also support any combination of MIMO (Multiple Input Multiple Output), SIMO (Single Input Multiple Output), MISO (Multiple Input Single Output), and SISO (Single Input Single Output) antennas.

Furthermore, as shown, the first RF front-end includes a SISO antenna dedicated for receiving preambles; however it is appreciated that the first RF front-end could be selected from any of the possible antenna combinations (MIMO, SIMO, MISO, SISO, etc.). In fact, in an alternate embodiment, the preamble detector 704 may be freely coupled to any of the generic front-end resources.

Preamble Detector

The preamble detector 704 is a component which is specifically adapted to detect the preamble (see, e.g., FIG. 2, and accompanying discussion for one example of such a preamble). In one exemplary embodiment, a CPC preamble detector is a correlating device which detects the presence of the aforementioned preamble 202. The preamble detector may operate either in the digital domain, or analog domain (e.g., a matched filter), or utilize components of both.

In the illustrated embodiment, the preamble detector 704 is a distinct entity from the decoding resources 706, cache memory 708, and the RF front-ends 702. Such an embodiment is particularly useful within the context of the present invention in that preamble detection does not consume, or may flexibly consume, any level of decoding or antenna resources to operate. In other embodiments, the preamble detector may be subsumed within either of the other entities, so as to achieve other goals or form factors including, inter alia, minimized die space, minimized power consumption, etc.

Figure 8:
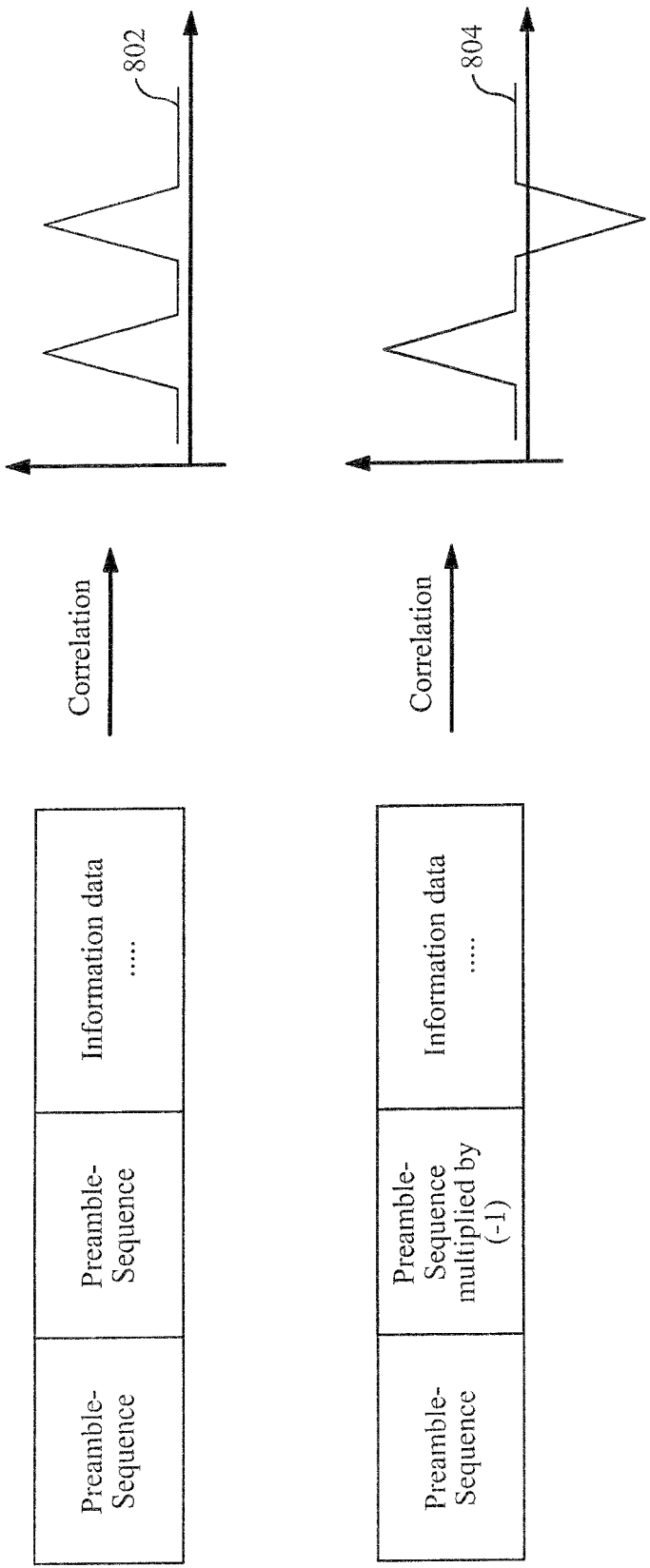
FIG. 8 is a graphical representation of one embodiment of a preamble weighting and correlation sequence used to uniquely weight each transmitted preamble.

In one embodiment, the preamble detector 704 is configured to give an initial "signature" for a received frame. For example, FIG. 8 illustrates one technique for embedding additional signature information within the preamble at the CPC preamble detector. In the first transmission sequence 802, the preamble is transmitted twice "in phase". In the second transmission 804, the preamble is transmitted once, and inverted (i.e., out of phase) for the following transmission, such as by multiplication by −1. The preamble detector can thus distinguish between the first and second transmission, on the basis of the correlation results (i.e., represented as [1, 1] and [1, −1]). Correlation sequences may have more complex weights than +1/−1 (i.e. BPSK) values, for example, a rotated QPSK (+1/−1/+j/−j) could be used, for higher-order (e.g., 64, 256) QAM constellations. Furthermore, correlation sequences may use different timing offsets to convey different information, or portions of information. For example, so-called pulse-position modulation (PPM) encodes information in the distance between two correlation peaks, and is used for instance in Ultra-Wideband (UWB) systems. Other differentiation schemes may be used as well, the foregoing being merely illustrative.

Figure 9:
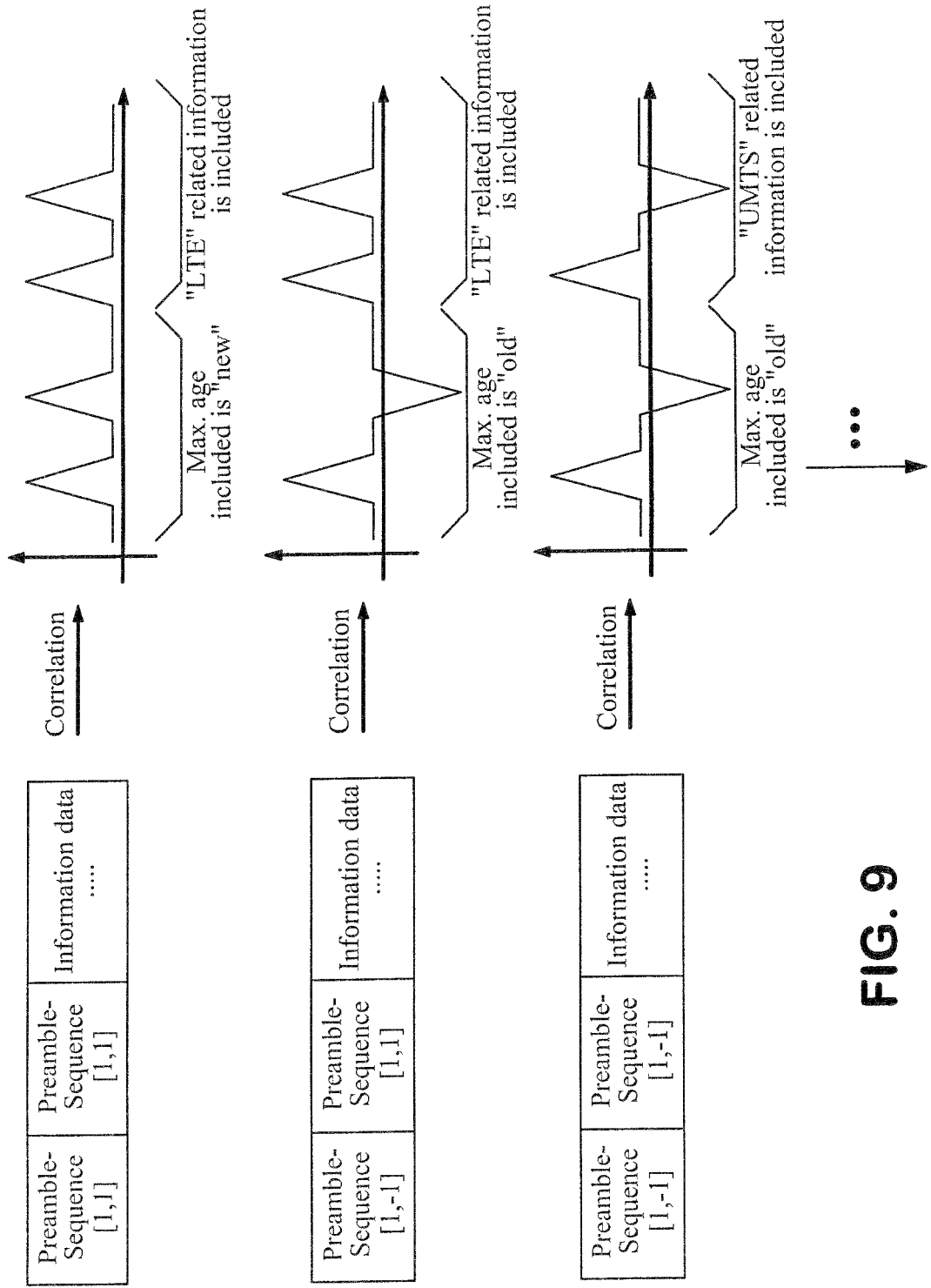
FIG. 9 is a graphical representation of three (3) exemplary preamble weightings, correlation sequences, and context information "hints" according to various embodiments of the invention.

FIG. 9 illustrates three (3) exemplary preamble sequences, and possible resultant interpretations. For simplicity, the preamble sequence is separated into a first "age" having two possibilities ("new"=[1, 1], "old"=[1, −1]), and a second "function" having two possibilities ("lte"=[1, 1], "units"=[1, −1]). The receiver correlates for the preamble, and based on the correlation result, can determine the contents of the context information.

Such differentiation may be useful for quickly identifying if the apparatus is interested in the context information during initial frame acquisition.

In another example, a base station may signify a change to frame data by weighting the preamble indicia. Changes to frame data may be indicated with a switching scheme between two (2) preambles for each information update (e.g., if there are no updates to the context information, then the weighting is kept the same).

In yet another exemplary embodiment, different preamble sequences may be used to signify various priority levels (e.g., age levels, applicable functionality, etc.), or encode yet other variables of interest to the apparatus. It is appreciated that such additional complexity to preamble detection may reduce unnecessary context information decoding (and hence further optimizing power consumption and/or overhead processing), in effect trading a small amount of increased complexity within the preamble detection process for a much larger amount of wasted processing and decoding. The preamble detector may be limited to detecting the preamble, and or preamble weight only; or alternatively, the preamble detector may decode some context information, or context information indicia. The degree to which the preamble detector performs more or less decoding is an issue of design choice, as more complex preamble detectors increase design complexity. Thus, such enhanced preamble decoding capability may be selectively employed within the apparatus (such as where it is switched on and utilized only where the radio network with which the apparatus is currently associated is capable of such transmissions).

In another embodiment of the present invention, the preamble detector is additionally configured to trigger further operation, based on one or more predetermined selection criteria. For example, in one such implementation, the preamble detector provides one or more interrupt signals for indicating a received transmission of interest. The preamble detector may for instance flag an interrupt upon receiving a designated preamble weight.

Interrupt services provide asynchronous notification for elements of interest. Interrupts vary greatly in scope and priority; low priority interrupts may be masked (i.e., ignored), whereas high priority interrupts can preempt the current processor execution. Subsequent to receiving an interrupt, the software can decode the public broadcast transmission. In one variant, responsive to receiving the interrupt, the software retrieves and decodes the public broadcast transmission from cache memory at will, thereby decoupling the immediacy associated with interrupt services.

More detailed interrupt trigger criteria may include: the presence of a certain set of age levels within a frame, the presence of a desired piece of information, or a combination of multiple criteria, etc. In some implementations, hardware interrupts (such as a dedicated pin, or register, etc.) may be used to trigger further action such as, inter alia, waking the device, decoding, fetching data, etc. Conversely, software interrupts may be used where hardware solutions are unnecessary, physically problematic, cost prohibitive, etc.

Cache Memory

Referring now to FIGS. 10A-10D, the cache memory described above may have several possible arrangements within the SDR radio subsystem. For example, in a first exemplary variant 1002 (FIG. 10A), the cache 708 is connected to the preamble detector 704 and the plurality of decoding resources 706 via a switch 710. In a second variant 1004 (FIG. 10B), the cache is serially connected between the preamble detector and the plurality of decoding resources. In yet a third variant 1006 (FIG. 10C), the cache is connected in parallel between the preamble detector and the plurality of decoding resources. In a fourth variant 1008 (FIG. 10D), the cache is connected to the outputs of the plurality of decoding resources. Other variations of the SDR radio subsystem that combine or incorporate the aforementioned variants may be readily constructed by those of ordinary skill in the arts given the present disclosure. Each of the foregoing variants is now described in greater detail.

Figure 10A:
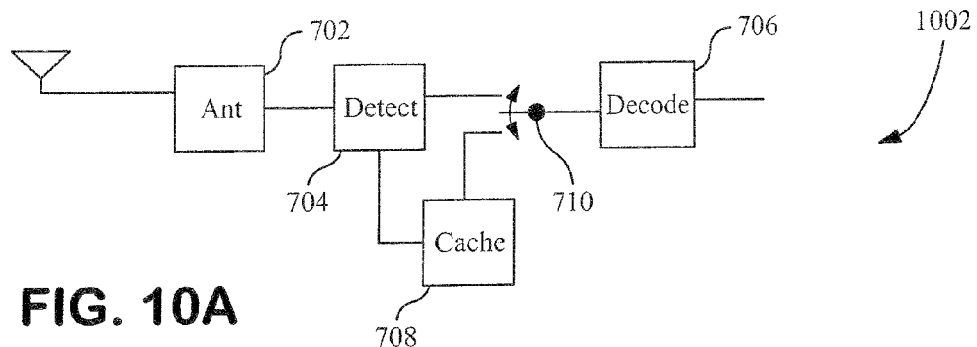
FIGS. 10A-10D are functional block diagrams illustrating various alternate topologies of a software defined radio (SDR) apparatus, adapted to implement the methods of the present invention.

In a first variant 1002 of FIG. 10A, the cache is connected in a switchable manner with the preamble detector 704 and the plurality of decoding resources 706. In this variant, the switch 710 has two (2) positions: preamble detector to decoding resources, and cache to decoding resources. As shown, the preamble detector is always connected to the cache memory; however other switching variants may connect the preamble detector to the cache memory. During operation, the cache memory is filled with preamble detector output. The preamble detector/cache assembly can store data samples, in isolation from the remaining portions of the modem subsystem (for example, enabling the modem subsystem to power down). When the preamble detector is directly connected to decoding resources, the cache is bypassed, and the SDR radio performs in typical fashion. If the modem subsystem is interested in evaluating previously cached context information, the switch can connect the cache to the plurality of decoding resources. The decoding resources read the cache contents to decode the appropriate context information.

Figure 10B:
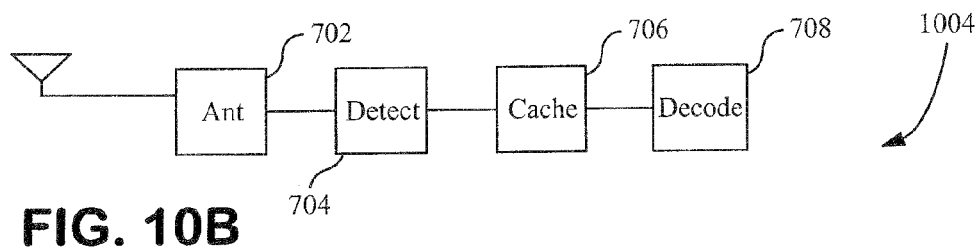

In the second variant 1004 of FIG. 10B, the cache 708 is connected in a serial manner between the preamble detector 704 and the plurality of decoding resources 706. During operation, the preamble detector stores data samples to the cache, while the plurality of decoding resources reads the data samples out of the cache. Serial construction is simple to implement, and requires very little control logic (unlike the switch of the first variant 1002. In one such serial embodiment, the cache is a First-in First-out (FIFO) buffer. Using a FIFO buffer, data samples are read out of the cache in the same order as they are written into the cache. Thus the FIFO buffer provides a degree of flexibility for when context information may be decoded. In alternate embodiments, a fully addressable buffer is used. Unlike a FIFO buffer which provides context information in a set sequence, a fully addressable buffer allows the decoder the ability to "jump" to entries of interest, potentially reducing some decoding burden. A circular buffer of the type well known in the art may also be implemented.

Figure 10C:
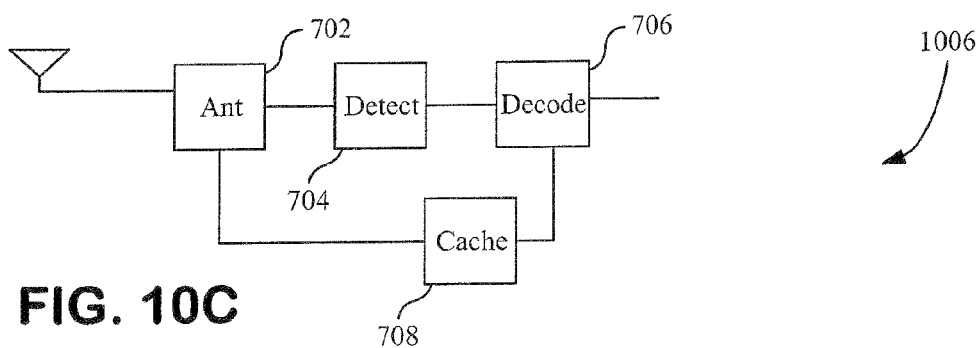

In the third variant 1006 of FIG. 10C, the cache 708 is connected in a parallel manner with the preamble detector 704 and the plurality of decoding resources 706. During operation, the preamble detector can simultaneously write data samples to the cache and/or the plurality of decoding resources. Similarly, the plurality of decoding resources may elect to receive data samples from either the cache, or the preamble detector. Similar to serial constructions, parallel construction is simple to implement and requires very little control logic. However, unlike serial topologies, parallel topologies are at least twice as densely connected, and may be less than ideal for compact designs which seek to reduce device pin counts, etc.

Figure 10D:
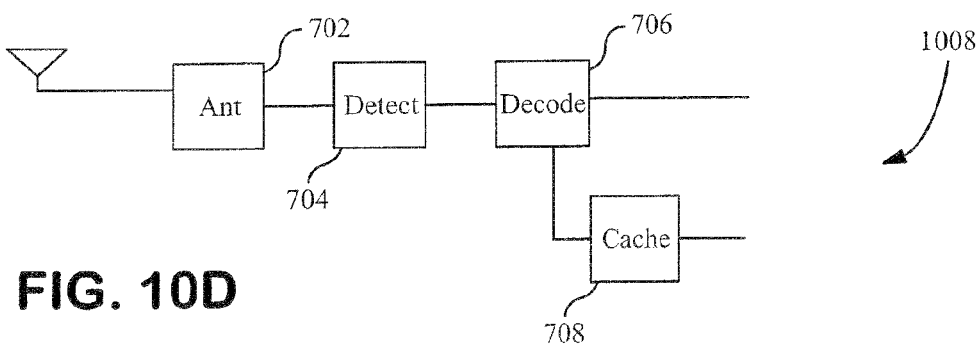

In the fourth variant 1008 of FIG. 10D, the cache 708 is connected to the outputs of the plurality of decoding resources 706. During operation, the plurality of decoding resources writes decoded context information to the cache. Post-decode caching requires decoding resources to be active for cache operation, thus, the post-decode caching is preferable for implementations where the decoding resources may be easily segregated (e.g., Orthogonal Frequency Division Multiplexing (OFDM) type modems, etc.), or are required for radio operation regardless. Post-decode data is much easier to manipulate and handle, thus, such implementations can be "virtualized" within existing software modules.

In one embodiment, the preamble detector 704, antenna assembly 702 and cache memory 708 are powered separately from the decoding resources 706. In another embodiment, the entire SDR radio frontend 700 is isolated, such that it can be powered separately from other subsystems. As previously mentioned (and discussed in greater detail hereinafter), a snoozing apparatus 600 only powers components for reception of context information. During snooze-mode, the client device stores context information to the cache 708. In one embodiment, a dedicated power domain is provided by the PMS 606, to only the low complexity preamble decoder, and the cache memory, as previously described.

Figure 11:
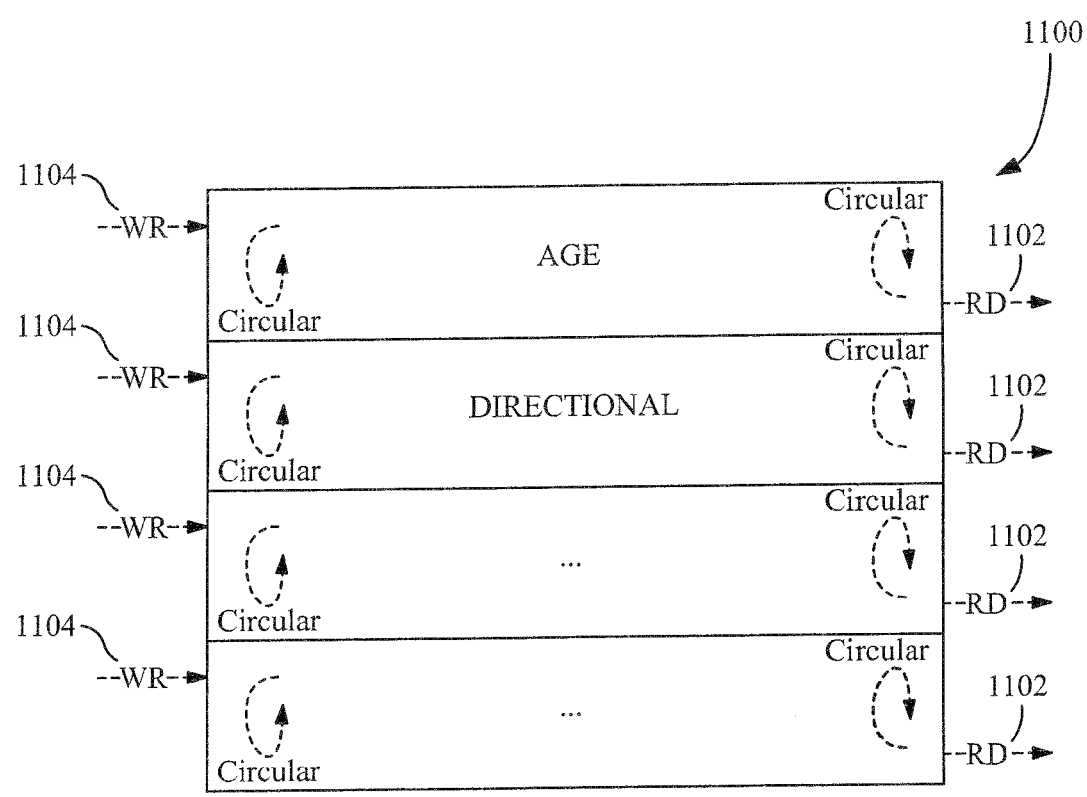
FIG. 11 is a graphical representation of one exemplary categorized First-In First-Out (FIFO) type buffer used for storing context information, accordance with the present invention.

Many possible implementations for cache memories 708 exist. As previously discussed, the cache memory may be a FIFO, addressable buffer, or circular buffer, etc. However in more complex embodiments, the cache memory may be further subdivided into various subsections and indexes. For example, FIG. 11 depicts one embodiment of a partitioned cache 1100. The partitioned cache is separated into four (4) sections, each of which has a separate read 1102 and write pointer 1104 for circular operation. Each partition may correspond with a specific message type having a preamble weighting. Thus, for instance, the first section may be allocated for preamble weighting [0, 0], which may correspond with age, and the second section may be allocated for preamble weighting [0, 1], corresponding to directional information, etc. In an aged preamble system, the first section may be allocated for the newest information; the second section may be allocated for older information, and so forth.

In yet other embodiments, the cache memory 708 can be implemented within a general memory, using more complex indexing and retrieval services. For example, a general memory can be coupled with timestamp capabilities. Software may determine based on timestamps, the appropriate locations in memory to access for suitable public broadcast information. In other implementations, the memory can be separated across Radio Access Technologies (useful for mixed networks), where the software may selectively identify only the context information specific to a particular RAT.

Accordingly, during operation the preamble detector 704 receives the context information, determines the appropriate weight and writes to the appropriate cache partition. In some embodiments, the context information may span multiple categories. More complex preamble detectors with decoding capability may be able to sort the context information into the appropriate cache locations. Other simpler preamble detectors may preferentially store the raw data samples in a single cache location, or duplicate the data samples across multiple cache locations. Post-processed data simplifies sorting and storing context information within cache memory.

At a later point, the plurality of decoding resources 706 may selectively retrieve cached context information pertaining to a specified preamble weighting. For instance, in the case of the aforementioned partitioned scheme 1100, if the apparatus is interested in decoding directional information, the preambles corresponding to the second preamble weighting [0,1] are retrieved and decoded.

In fact, given the foregoing discussion, any artisan of ordinary skill will recognize that "filtering" context information, either explicitly or implicitly, can greatly improve overall cache effectiveness. Consequently, in various embodiments of the present invention, the cache may further store categorization information useful for quickly identifying context information of interest. Examples of such categorization information include: preamble weight, index, tag, length, time of receipt, time of storage, duration of storage, etc. Such categorization information may find additional value when coupled with for example intelligent software configured to make effective use of the cached information based on such categorization.

Decoding Resources

Referring back to FIG. 7, the plurality of decoding resources 706 of the illustrated embodiment includes apparatus adapted to decode received data. Generally, decoding resources may include such elements as processing elements, application specific circuitry, and or other common communication elements, such as Fast Fourier Transforms (FFT) processing, Multiply Accumulate (MAC) logic, arithmetic logic units (ALU), floating point logic, etc. In one LTE RAT-specific embodiment, the decoding resources are configurable FFT-based computational resources, adapted for decoding subcarriers of an Orthogonal Frequency Division Multiple Access/Time Division Multiple Access (OFDMA/TDMA) modulation scheme. Such FFT resources are flexibly programmed at subframe time intervals to decode any subset of a plurality of the subcarriers which populate the entire carrier bandwidth. The subdivision of time (i.e., subframes) and frequency (i.e., subcarriers) can be viewed as a "grid" of decoding resources.

In multimode systems, multiple types of preamble detectors 704, RF front-ends 702, decoding resources 706, and cache configurations 708 may be intermixed, and or interchanged. In some cases, the functionality of one or more components may be performed by a single component. The numerous possible combinations of the various RF front-ends, preamble detectors, caches and decoding resources are readily appreciated by those of ordinary skill in the arts given the present disclosure.

Exemplary SDR Base Station (BS) Apparatus

Figure 12:
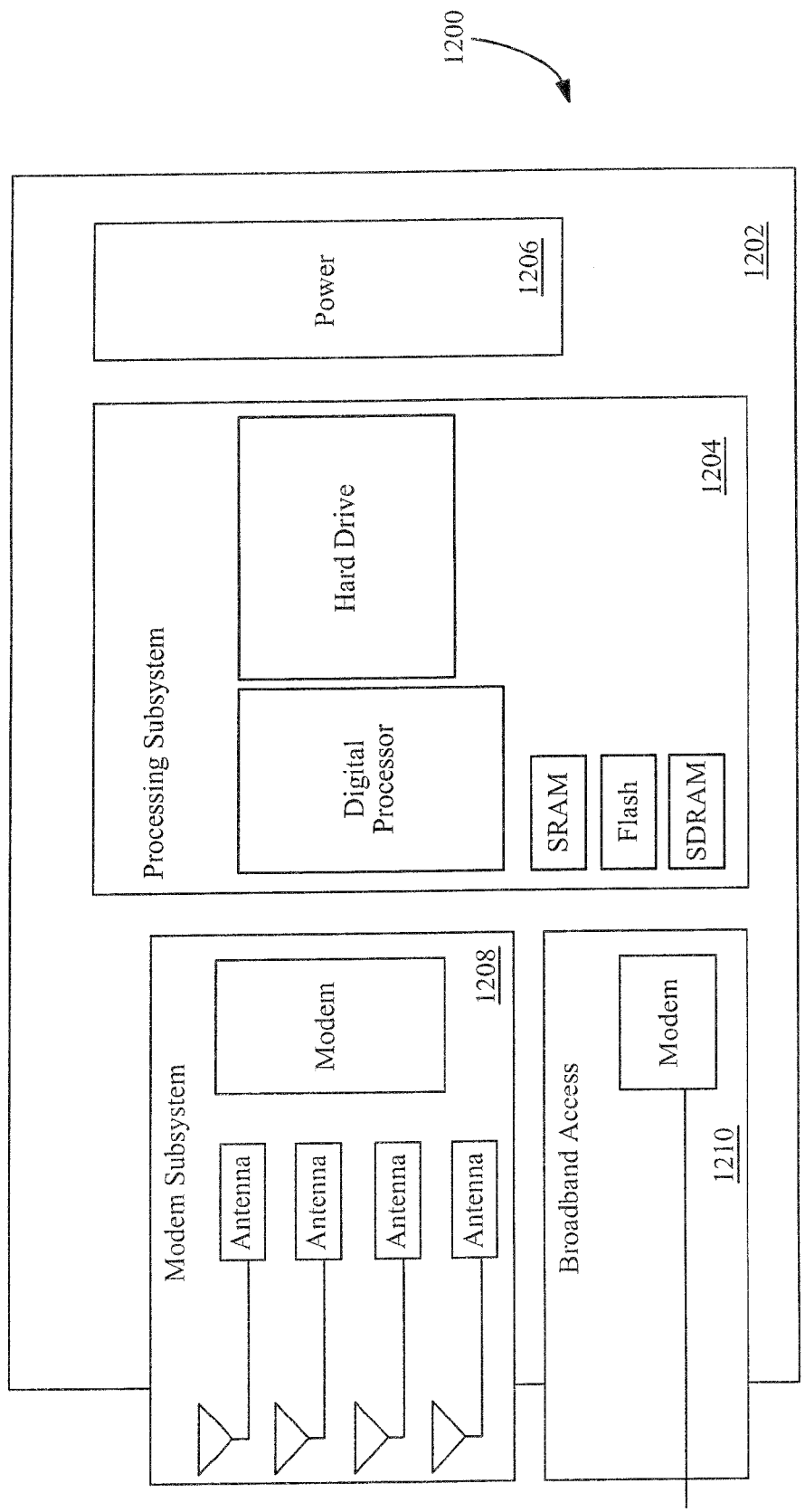
FIG. 12 is a functional block diagram illustrating one embodiment of a base station apparatus adapted to implement the methods of the present invention.

Referring now to FIG. 12, one embodiment of serving base station apparatus 1200 implementing the methods of the present invention is illustrated (for other possible design implementations, see also U.S. patent application Ser. No. 12/512,761 filed Jul. 30, 2009 and entitled "Methods and Apparatus for Providing Dynamic Information in a Wireless Information Channel" previously incorporated herein). The base station apparatus 1200 includes one or more substrate(s) 1202 that further include a plurality of integrated circuits including a processing subsystem 1204 such as a digital signal processor (DSP), microprocessor, gate array, PLD, or plurality of processing components, as well as a power management subsystem 1206 that provides power to the base station 1200.

The embodiment of the apparatus 1200 shown in FIG. 12 at a high level includes a modem circuit 1208 configured to provide a segmented public broadcast of basic system information. The segmented public broadcast includes for example a time-varying broadcast of system information (SI) such as those described in previous sections (see Exemplary Cognitive Pilot Channel, etc.). In alternate embodiments, the segments may be transmitted via secondary frequency bands, and/or code domains, etc. The modem subsystem includes one or more digital modems and a plurality of radio antennae.

The broadband access circuit 1210 is configured to provide access to the Core Network 106, and potentially other network entities (e.g. eNBs, HeNBs, etc.). The broadband access may comprise for example a simple DSL connection. In other embodiments, the broadband access may comprise a T1, ISDN, satellite link, optical fiber link, microwave link, or DOCSIS cable modem. In one variant, the broadband access only supports authenticated connections, thereby ensuring secure and authorized connections to the network infrastructure. In other variants, the broadband access can provide substantially unauthenticated access to other IP networks, thereby offering a wireless gateway to any connected internets, or the Internet (e.g., such as may be useful with WLAN embodiments of the invention).

The processing subsystem 1204 may comprise a plurality of processors (or multi-core processor(s)). As used herein, the term "processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

The processing subsystem 1204 is preferably connected to one or more memory components. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. The memory subsystem of the embodiment illustrated in FIG. 12 includes various forms of volatile (e.g. SRAM, SDRAM, etc.) and non-volatile memory such as a hard disk drive (HDD), and or Flash. Additionally, the processing subsystem may also comprise a cache to facilitate processing operations.

In the illustrated embodiment, the processing subsystem additionally includes functional subsystems or modules for: determining segments of basic system information, prioritizing the segments, and efficiently using spectral resources to distribute the various groups of segments to a population of UEs. These subsystems may be implemented in software, firmware and/or hardware, and are logically and/or physically coupled to the processing subsystem.

Alternatively, in another variant, the subsystems or modules may be directly coupled to the transmitter of the subsystem. The illustrated embodiment of the apparatus logically connects the segmentation subsystem, the prioritizing subsystem, and the distribution subsystem.

In one embodiment, the segmentation subsystem includes a database or memory structure localized within the apparatus 1200 adapted to store one or more segments of the public broadcast information. Such segments may be derived at least in part from internal device operations, such as current UE occupancy, current time, current location, etc. In one variant, the segmentation subsystem may comprise a circular buffer or shift register. In alternate embodiments, the subsystem includes one or more interfaces to a centralized network controller, where the centralized network controller provides one or more of segments of the public broadcast information. In yet another embodiment, the segments of public broadcast information may be related to properties which are queried or received from one or more external devices (e.g., nearby WLAN networks, etc.), In yet another embodiment, the segments of the public broadcast information may be set based on an environmental or location consideration, such as cells operating in the vicinity of a hospital.

The prioritizing subsystem of the apparatus may include for example monitoring apparatus for network activity, or memory apparatus adapted to store knowledge of the network activity. The input network parameters are provided to an optimization engine (e.g., algorithm implemented as a computer program executed by the processing subsystem) for dynamically assigning a priority to one or more segments of public broadcast information. It will be appreciated that the segmented public broadcast information may change on a regular or irregular basis; thus, the optimization engine may be run only in response to corresponding changes if desired. Furthermore, the prioritization subsystem may additionally include one or more interfaces adapted to exchange information with neighboring base stations or other network entities (e.g., inter-RAT compatible base stations, Wi-Fi Access Points, etc.).

The distribution subsystem of the apparatus 1200 includes in one embodiment apparatus for broadcasting the various segments of the public broadcast information to the UEs. In one embodiment, the distribution subsystem is a time varying rotation of one or more segments of public broadcast information. In another embodiment, the distribution subsystem provides a time varying length of transmission. The distribution subsystem may also utilize multiple spreading codes (e.g., a CDMA based system), or alternately, other frequency bands (e.g., a FDMA based system), etc. In yet another embodiment, the distribution subsystem provides varying segmented public broadcasts based on one or more network parameters.

In one exemplary embodiment, the distribution subsystem of the apparatus 1200 configures its distribution to elicit a desired response at one or more corresponding client apparatus. For example, in one exemplary embodiment, the base station weights its preambles, whereby a properly configured client apparatus may determine characteristics of the contents of the varying segments of information. In one such variant, the configuration is predefined. For example, an enabled client may have predefined preamble weights for certain context information types. In other such variants, the preamble weights are defined "on the fly" using existing messaging systems. For example, LTE radio access networks publicly broadcast system information in System Information Blocks (SIB), or Master Information Blocks (MIB). An invention-enabled eNB 1200 may transmit SIBs that correlate various preamble weights with context information types. A UE may catalog a listing of preamble weights and context information types, for use in decoding subsequently cached publicly broadcast system information.

The distribution subsystem of the apparatus 1200 of FIG. 12 is adapted to transmit CPC frames for an LTE network, where at least a subset of the segments of the publicly broadcast information are TLVs of varying age levels. In one exemplary implementation, the CPC frames are additionally configured to substantially minimize SDR UE power consumption, by providing variable length transmissions, suited for differing SDR UE requirements. In some variants, the aforementioned preamble weighting variants may further enable SDR UE "snooze" modes (as previously described), further improving power consumption.

Methods

Exemplary methods of operating the aforementioned client device 600 are now described in greater detail. In the exemplary embodiment of the invention, one or more segments of basic system information in a wireless (e.g., LTE cellular) radio system are transmitted, and received according to one or more desired preset reception criteria, such that the client device can decode the context information at a later time. The wide applications of such operation include reduced power operation (e.g., snooze-mode), efficient radio operation based on predetermined criteria, etc.

In one aspect of the present invention, the client device selectively receives public broadcast transmissions based on context information of interest (predetermination). In one such embodiment, the client device selectively decodes the public broadcasts transmissions using a schedule received from its primary service provider. In another embodiment, the schedule is provided by out-of-band signaling. As used herein, the term "out-of-band signaling" does not refer exclusively to signaling in a physically separate communications medium or band, but merely that such control is logically separated from data flow and call/control. For example, in one such variant, the out-of-band signaling is an IP-based service running over an existing data connections Referring now to FIG. 13, at optional step 1302 of the method 1300, the client apparatus identifies its nearby Radio Access Technologies (RATs), and associated context information types which may be of interest. In one embodiment, a Software Defined Radio (SDR) UE decodes one or more Cognitive Pilot Channels (CPCs) corresponding to its existing data connections. Thus, a first radio access technology and a second radio technology have a first and second CPC, respectively.

For example, consider several UEs which are in the coverage of multiple base stations, providing a number of Cognitive Pilot Channels (CPCs). Each of the UEs may selectively choose to receive and exploit the information of one or more of the CPCs. A UE which is interested in multiple CPCs allocate additional decoding resources for each CPC. Alternately, a UE may receive CPCs for a first and second network within the cache memory, and decode each of the foregoing, at will.

In another example, the client apparatus identifies nearby (but currently unconnected) RATs via its connected data links. In one variant, the client apparatus queries a service discovery service. The UE apparatus, upon connection with a first serving radio technology of CPC provider, may query a local database containing information pertaining to nearby second radio access technologies (e.g., a second CPC provider). Such information may be provided via e.g., an IP-based service or other such transport.

In another variant, the client apparatus receives context information for its neighbors directly from its current connection. For example, the client apparatus, receives context information for a first and second networks from its connection to the first network. In one exemplary case, each of the various service providers agree to include context information related to the nearby services, in their own context information transmissions. Thus, the first RAT provider includes context information for the second RAT. Accordingly, a UE can arbitrarily receive any available CPC to identify CPC information for the entire community.

In yet other embodiments, the client apparatus has predefined information regarding one or more supported RATs.

Referring back to FIG. 13, at step 1304, the client apparatus identifies one or more selection criteria for operation within one or more Radio Access Technologies (RATs). In one embodiment, these selection criteria are stored within a preamble detection device. The selection criteria may be related to a prioritized type of segmented context information, or alternatively may be specific to a type of segment of context information, regardless of priority. In yet another embodiment, the selection criteria may be based on one or more values anticipated at a simple preamble detection device. In one such variant, these values include an array of indicia, which provide insight into a larger portion of a segmented public broadcast.

For example, in one embodiment, a device preparing to enter snooze-mode will configure its preamble detection and cache assembly to detect and record segments of public broadcast transmissions. The device can further clarify that only transmissions having preambles indicative of age, direction, etc. may be stored. Alternatively, the device may indiscriminately record all transmissions, and sort the recorded CPC transmissions later, such as using the aforementioned "intelligent" software process.

In still another embodiment, a device can configure its preamble detection and cache assembly to detect and record context information transmissions for later use. For example, the device can record context information containing location-specific information, or nearby wireless neighborhoods. If the device begins to move, the device can retrieve the applicable information immediately.

The multitude and complexity of interrelated network states and transitions which may be evaluated by the SDR device of the invention create a near limitless variety of selection criteria, as will be recognized by those of ordinary skill given the present disclosure.

Furthermore, while the aforementioned selection criteria are substantially device-centric, it is appreciated that in some embodiments the wireless network entity (e.g., a base station, access point, etc.) may dynamically alter how and when public broadcast messages are received by the wireless devices. For example, in one exemplary embodiment, the base station defines and broadcasts messages on the fly using existing messaging systems, such as the aforementioned LTE radio access networks System Information Blocks (SIB), or Master Information Blocks (MIB). In another example, the wireless network entity may elect a first method for context information delivery for active devices, and a second method for inactive or unconnected devices. Moreover, certain wireless networks may not support the various modes described herein, in which case the wireless device must adapt to the prevailing broadcast scheme.

For example, a first device which is operating with an active radio link may receive a first type of preamble for pilot channel updates, which is limited to very recent changes to various services, or network notifications. Such delivery requires some minor amount of preamble detection complexity, but ensures that minimal additional decoding resources are consumed for administrative needs. Conversely, a snoozing device may only selectively receive a second type of preamble, where the preamble indicates that the segments of the transmission are suitable for later decoding (i.e., are not time sensitive). In this example, a network control entity may dynamically change the frequency of first and second broadcast types, to suit the various network requirements. In one illustrative instance, a BS located at a train station may opt to transmit the second types of preambles when a trainload of passengers arrives (e.g., to acclimatize the large number of users quickly), however switch to a first type of preambles when the train station is mostly idle.

At step 1306 of the method 1300, the SDR UE enables cached operation for one or more first Radio Access Technologies (RAT). In one embodiment, all other subsystems are powered down, or reduce power consumption (snooze-mode). In an alternate mode, other subsystems retain power but are tasked with alternate activities. In one such variant, the remaining radio subsystem is allocated for transmitting and receiving in the first Radio Access Technology (RAT). In yet another such variant, the remaining radio subsystem is allocated for transmitting and receiving in a second Radio Access Technology (RAT), different than the first RAT.

During operation, the client device receives context information via public broadcast transmissions, and stores them to the cache memory. In one embodiment, the context information is further filtered such that only certain types of context information are stored. In alternate embodiments, all context information is stored, and filtering is done at a later stage (see previous discussions regarding cache operation).

In one such implementation, the context information is identified based on one or more preamble detection results. To this end, the present invention contemplates in one embodiment the use of a supplemental preamble weighting determination which can, inter alia, determine a unique weighting for a received preamble to determine if the context information of the transmission is should be stored, or discarded. Preamble detection schemes were previously described in the foregoing discussions of FIGS. 8, and 9.

Context information may be stored for example sequentially in a First-in First-out (FIFO) manner, as discussed above. Alternately, context information may be stored based on one or more categorizations. Moreover, context information may be stored in accordance with preamble weighting, age, content, etc. and in order of arrival. In yet another variation, the CPC transmissions may be stored in a generalized memory, and simply read out in accordance with other data (e.g., timestamp data, internal indexing, etc.). Yet other methods and data structures are readily apparent to those skilled in the art, given the present disclosure.

At a later time, the SDR device retrieves cached public broadcast data transmissions at step 1308. In one embodiment, the retrieval of cached public broadcast data is based on a selection of transmissions likely to be of interest. In other embodiments, the retrieved data is presented in the order with which it was received, or stored.

The public broadcast data can be retrieved based on one or more preamble weightings. For instance, the SDR UE may retrieve all data having a distinct weight, where the distinct weight indicates one representative prioritized level within the accompanying context information (e.g., preamble weight corresponds to a categorization, such as user class, radio access technology, "high" priority traffic, etc.). In another example, the SDR client may retrieve any data having different weights (e.g., where preamble weight corresponds to content type, within a categorization, such as age level). For example, in one such variant, the SDR client may only retrieve the most recent (as measured by timestamps) of each preamble weight, where each preamble weight is accordingly assigned to an age level new, recent, old, very old.

In another embodiment, the public transmissions are retrieved based on the contained context information. In such variants, the context information is extracted based on age level, importance, type of service, business method types, etc. In yet another embodiment, the public data broadcasts transmissions are retrieved sequentially in a First-in First-out (FIFO) manner. Other approaches (such as Last-in, First-out, or LIFO) may be used as well. For instance, a LIFO retrieves the most recently received public data broadcast transmissions. LIFO approaches may be particularly useful in systems that provide independently decodable public broadcast information (in contrast to systems that build on previously transmitted updates). LIFO implementations generally do not require analysis of the age of the preamble, and may further simplify receiver design.

Figure 13:
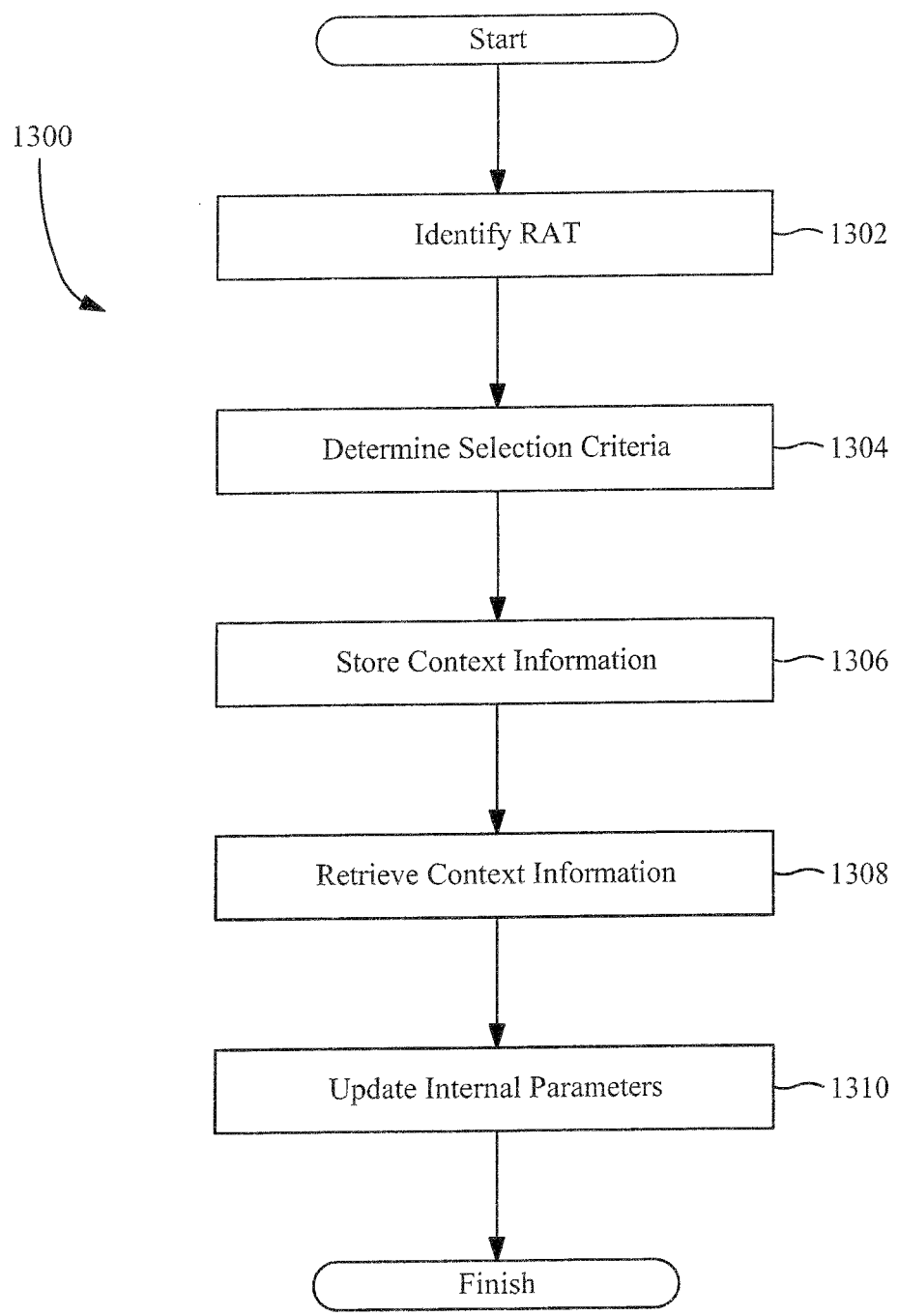
FIG. 13 is a logical flow diagram illustrating one embodiment of a generalized process for receiving, storing, and later decoding selected segments of publicly broadcast system information, in accordance with the present invention.

Lastly, at step 1310 of the method 1300 of FIG. 13, the client apparatus updates its internal parameters with the public broadcast information.

Figure 14:
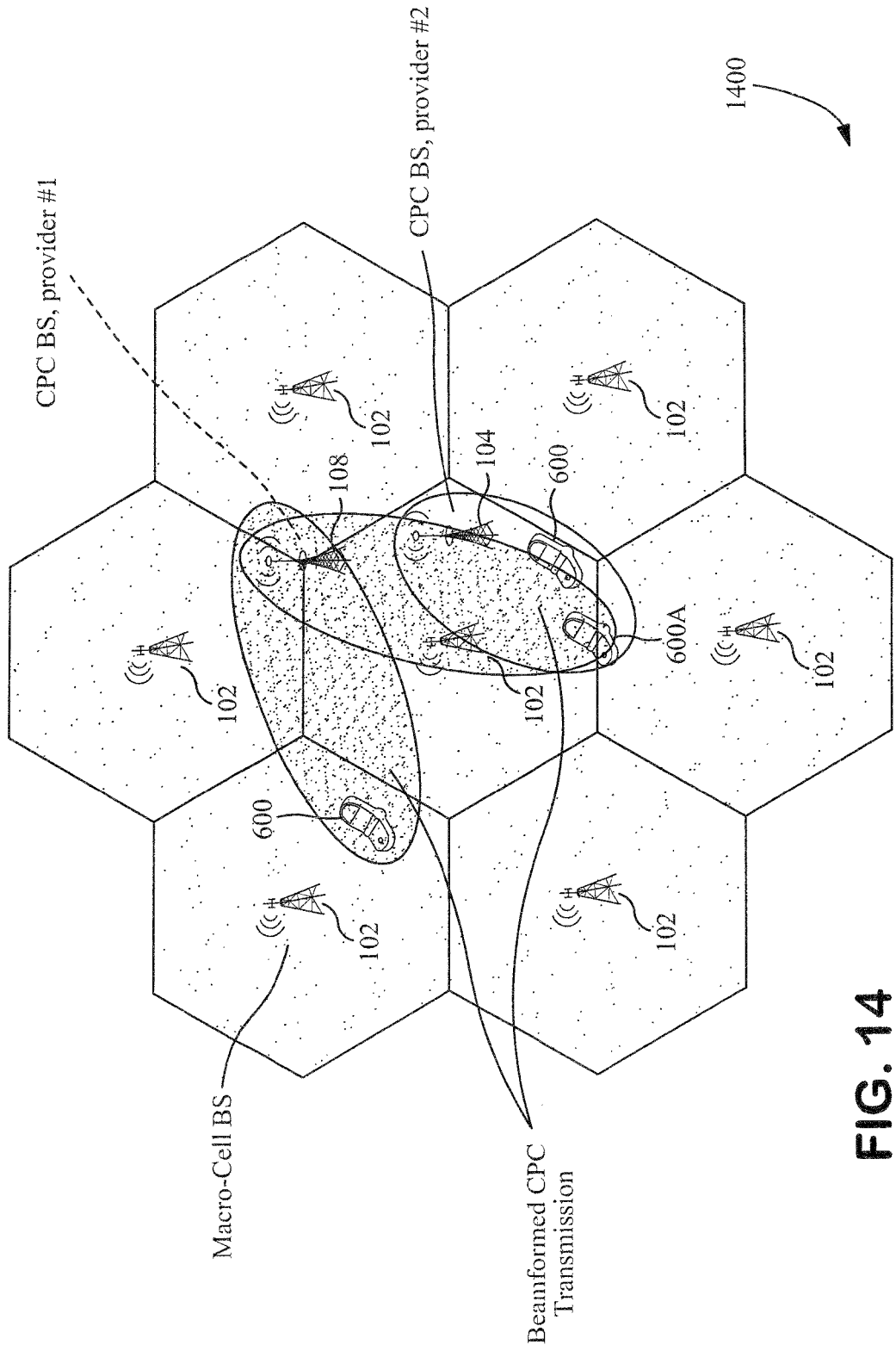
FIG. 14 is a second graphical representation of an exemplary heterogeneous Radio Access Network (RAN) providing a first, second and third different Radio Access Technologies (RATs), useful for implementing one or more aspects of the present invention.
Figure 15:
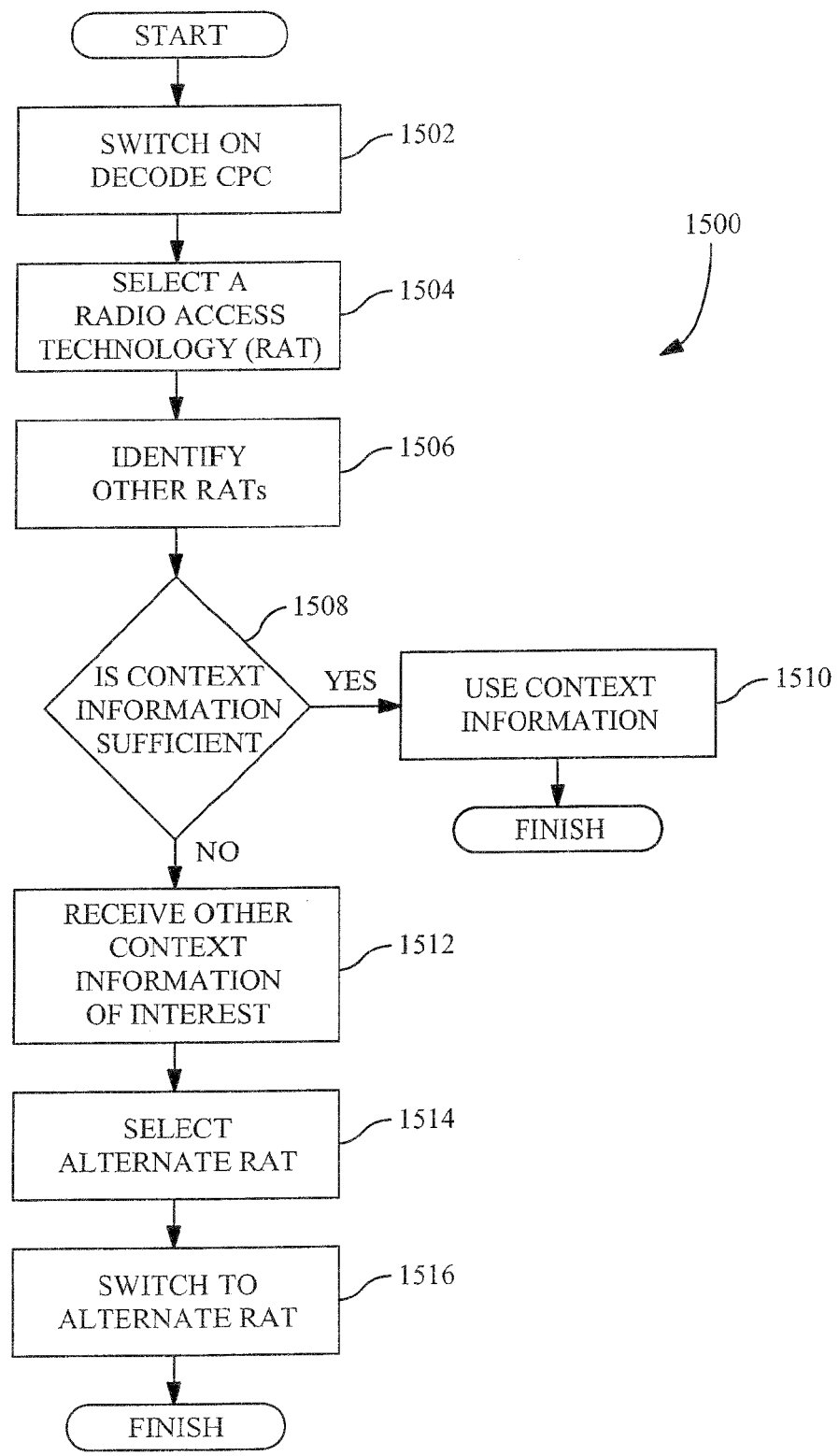
FIG. 15 is a logical flow diagram of one embodiment of a process for initializing, and configuring a receiver apparatus to receive selected segments of publicly broadcast system information, in accordance with the present invention.

FIGS. 14 and 15 illustrate one specific implementation of the foregoing processes and apparatus. FIG. 14 illustrates a network of eNBs 102, interspersed with a HeNB 104, and a WLAN AP 108. The HeNB provides a first CPC (CPC BS Provider #1). The WLAN AP provides a second CPC (CPC BS Provider #2). Both CPC #1 and CPC #2 are "third-party" CPCs. As shown, a small population of UEs 600 is intermittently receiving transmissions from each of the BSs. Within the foregoing scenario, a first UE 600A powers on, and connects to the larger macro network. Thereafter, in accordance with several aspects of the present invention, the first UE can receive third-party CPCs of interest, and continuously monitor changes to all CPCs, while advantageously using relatively little power and minimizing processing burden.

FIG. 15 illustrates one scenario for initializing, and configuring a receiver apparatus to receive selected segments of publicly broadcast system information. At 1502, the first UE powers on and decodes the available CPC channels. As shown, the UE detects a LTE network serviced by eNB 102A.

At a first step 1504, the first UE selects a radio access technology (RAT). In this case, the UE connects to the LTE network, and initiates communication with the Core Network for registration, authentication, authorization, etc.

At a second step 1506, based on the CPC information from eNB 102A, the UE identifies the presence of additional RATs (served by HeNB 104, and WLAN AP 108, respectively). In this case, the UE uses its data link to contact a CPC server for additional CPC information of the other third-party CPCs e.g., scheduling, prospective services, etc.

Unfortunately, at 1506 the UE may not have all the necessary context information. For example, if the UE has decoded the CPC frame structure of FIG. 5 at T1, then only the CI[4] information is available.

At a third step 1508, the UE determines based on its internal criteria (e.g., application requirements, preferential services, etc.) if the current CPC information is sufficient for RAT selection. If the UE does not require additional information then the procedure terminates, and the UE operates using its current CPC information (1510).

If the current CPC information is insufficient, then the UE determines the other information which is desired, or should be appropriately monitored. At a fourth step 1512, the UE configures its preamble detector and caching system to receive the CPCs of interest.

At a later point, the UE may opt to change its currently connected RAT. For example, the UE may realize that the nearby HeNB 104 provides a desirable data service per CPC #1. Consequently, at step 1514, the UE connects to the HeNB, and thereafter monitors the other CPCs (step 1516).

Business Methods and Rules

It will be recognized that the foregoing network apparatus and methodologies may be readily adapted to various business models. For example, in one such model, a service provider/network operator may sell, lease, or freely provide (i.e., at no cost, such as via an incentive program) enhanced devices including e.g., mobile devices or handsets/UEs. Appropriately enabled user equipment may receive enhanced pilot channel messages, and/or more efficiently monitor existing pilot channels, thus increasing the overall perceived quality of a user's experience (e.g., through longer mobile device battery charge life). In one such embodiment, a dedicated subset of pilot channels are allocated to enabled UEs. Thus, while legacy devices continue to inefficiently monitor pilot channels (as previously described herein), invention-enabled devices only monitor the subset of enabled channels, which is markedly more efficient (and considerably improves power consumption and resource allocation).

The aforementioned network apparatus and methodologies may also be readily adapted for operation in accordance with an underlying business rules algorithm or "engine". This business rules engine may comprise for example a software application (and/or firmware, or even hardware aspects), and is implemented in one embodiment as a separate entity at the Core Network, or alternatively within an existing entity residing at the Core Network or other network management process (NMP). The rules engine is in effect a high-layer supervisory process which aids the network operator (or other interested party) in making operational decisions or resource allocations based on important criteria such as financial aspects, user experience enhancement, and/or operational considerations (e.g., reliability, fault tolerance, ongoing or schedule maintenance, component failure), etc.

In one such embodiment, the business rules engine is configured to take into account the revenue and/or profit implications associated with providing resources to one or more users. Accordingly, the exemplary business rules engine can modify the pilot channel behaviors of the system to support a wider base of users (e.g., providing relatively simple, but high quantities of pilot messages) or alternatively, a wider range of services (e.g., more complex pilot channel messages having a greater or more intricate range of functionalities). It may be that service to the wider base of users, and/or enhanced service offerings, may drive increased revenue and/or profit, or incentive new network subscribers.

For instance, in one example, evaluation of the pilot channel allocations may include an analysis of the incremental cost, revenue, and/or profit associated with the various different allocation options. In some cases, the network provider may determine that new service requests are relatively uncommon, and thus pilot channels are less important. In other cases, the network provider may determine that new users and services are frequently entering and exiting a cell (e.g., such as in the case of the aforementioned commuter or passenger train which traverses the cell multiple times a day, and brings with it numerous different users in a short interval of time), thus requiring an allocation of more pilot channel resources. These "business rules" may be imposed e.g., at time of resource request, and then maintained for a period of time (or until an event triggering a re-evaluation occurs), or alternatively according to a periodic or schedule model (e.g., during certain hours of the day, days of the week, holidays, etc.).

In another embodiment, certain types of context information may be restricted from, or made useful for business and or accounting methods (e.g., "gold", "silver", "vip", etc.). For example, a subscriber willing to pay more money may be privy to enhanced services. A premium subscriber may receive "gold" or "vip" context information, whereas a less premium subscriber may receive "silver" context information. For instance, a wireless hotspot may only provision usage of its resources for "vip" users. Users which are not subscribed to these premium groups would not decode the context information.

In yet other embodiments, cognitive pilot channels may be used for advertising one or more nearby services of interest. Such advertisements may be directly profitable, e.g., as a fee based subscription service, or may be indirectly profitable e.g., attracting customers to a desired area, increasing perceived value of a UE handset. For example, context information could be used to broadcast or advertise price schemes, or incentivized data services within a general location. Also, context information may be used to "meter" out services. For example, a WLAN operating near its maximum capacity may decline further CPC information broadcasts.

Myriad other schemes for implementing dynamic allocation of resources will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:
1. A wireless receiver apparatus, comprising:
an antenna;
a preamble detection circuit in signal communication with the antenna;
a storage apparatus in operative communication with the wireless receiver apparatus; and
decoding resources in operative communication with the wireless receiver apparatus;
wherein the wireless receiver apparatus is configured to selectively monitor for data frames of interest using at least the preamble detection circuit; and
wherein the wireless receiver apparatus is further configured to selectively store undecoded data frames received via the antenna within the storage apparatus based at least in part on a preamble detected within the received undecoded data frames.

2. The apparatus of claim 1, wherein the preamble detection circuit is in data communication with the storage apparatus, and in switched communication with the decoding resources.

3. The apparatus of claim 1, wherein the antenna, preamble detection circuit, storage apparatus, and decoding resources are disposed in serial fashion.

4. The apparatus of claim 1, wherein the storage apparatus and the preamble detection circuit are both in signal communication with the antenna in parallel, and the decoding resources are in data communication with both the preamble detection circuit and storage apparatus also in parallel.

5. The apparatus of claim 1, wherein the preamble detection circuit is in communication with the antenna, and the decoding resources are in communication with the preamble detection circuit, and the storage apparatus is in data communication with the decoding resources.

6. The apparatus of claim 1, wherein the apparatus further comprises a user interface.

7. The apparatus of claim 6, wherein the user interface is further configured to enable user selected decode of one or more data services based at least in part on a preamble detected within one or more received data frames.

8. The apparatus of claim 6, wherein the detected preamble indicates one or more Quality of Service (QoS) parameters.

9. The apparatus of claim 6, wherein the detected preamble indicates one or more pricing parameters.

10. A method of operating a wireless receiver, comprising:
receiving a plurality of data frames over at least one antenna associated with the wireless receiver, at least some of the plurality of data frames comprising a preamble, one or more pointers, and a plurality of context information, where the wireless receiver is receiving the plurality of data frames while operating in a power-save mode which disables decoding resources;
evaluating one or more preambles to determine whether a corresponding one or more data frames of the at least some of the plurality of data frames are of interest based on at least one criterion; and
upon detecting the one or more data frames of interest, resuming a normal power mode enabling the decoding resources of the wireless receiver and selectively decoding at least portions of the data frames of interest to retrieve a corresponding context information.

11. The method of claim 10, wherein each pointer of the one or more pointers provides an index which references a distinct location.

12. The method of claim 11, wherein the index comprises an age level.

13. The method of claim 11, wherein the index comprises based on a type of service.

14. The method of claim 11, wherein the index is based at least in part on a type of device.

* * * * *